(12) United States Patent
Fortune et al.

(10) Patent No.: US 7,416,131 B2
(45) Date of Patent: Aug. 26, 2008

(54) ELECTRONIC TRANSACTION PROCESSING SERVER WITH AUTOMATED TRANSACTION EVALUATION

(75) Inventors: Peter Stanley Fortune, Reading (GB); Nigel Kevin Savory, Bath (GB); Gareth Rory Priest, Reading (GB); Christopher Curtis Martin, Portsmouth, NH (US); Thomas D Gaillard, Exeter, NH (US)

(73) Assignee: Bottom line Technologies (DE), Inc., Portsmouth, NH (US)

( * ) Notice: Subject to any disclaimer, the term of this patent is extended or adjusted under 35 U.S.C. 154(b) by 37 days.

(21) Appl. No.: 11/638,621

(22) Filed: Dec. 13, 2006

(65) Prior Publication Data

US 2008/0144881 A1 Jun. 19, 2008

(51) Int. Cl.
*G06K 19/00* (2006.01)
(52) U.S. Cl. .................. 235/487; 235/375; 235/383
(58) Field of Classification Search ................. 235/375, 235/383, 487
See application file for complete search history.

*Primary Examiner*—Uyen-Chau N. Le
*Assistant Examiner*—Tuyen K Vo
(74) *Attorney, Agent, or Firm*—Timothy P. O'Hagan

(57) ABSTRACT

An invoice processing system includes a document system and an invoice hub. The document system receives a document image (either a paper invoice or an image file). A character recognition system generates a data file representation of the invoice data from the document image. A data field value validation engine determines, for each data field, a rule associated with each data field. The rule is applied to the data field value to distinguish between a valid field value and suspect data value. A correction center: i) displays a portion of the document image comprising the suspect field value; ii) receives user input of a replacement value to replace the suspect field value as the data field value. The invoice hub receives the data file which includes all validated data field values and stores the invoice data in a transaction database. A spend management evaluation module performs an evaluation function of a selected one of a plurality of evaluation parameter sets to generate a resulting value. Based on the resulting value, the spend management module may determine an evaluation field value in accordance with the defined action associated with the resulting value. The evaluation field value is then associated with the at least one record of invoice data.

21 Claims, 22 Drawing Sheets

| ASCII 96 | X 98 | Y 100 |
|---|---|---|
| Invoice: | 1 | 6.25 |
| 0534 | 2.25 | 6.25 |
| Date: | 3.75 | 6.25 |
| 01/01/06 | 4.25 | 6.25 |
| PO: | | |
| 15742 | | |

| Custom Image Library 105 | Date Field Identifier 104 | ASCII String 106 |
|---|---|---|
| S 60 | Supplier Name | Supplier, Inc. |
| | Supplier Address | 123 Street Name |
| | Supplier City | City |
| | Supplier State | State |
| | Supplier Postal Code | 01234 |
| *Supplier Inc.* *12345 Street Name* *City, State, 01234* 62 | Supplier Name | Supplier, Inc. |
| | Supplier Address | 123 Street Name |
| | Supplier City | City |
| | Supplier State | State |
| | Supplier Postal Code | 01234 |
| ... | ... | ... |

Figure 6

| Data Field Identifier 104 | Validation Rules 118 |
|---|---|
| PO Number | |
| Zip Code | 5 Digits |
| Supplier Name | |

Invoice Summary Table 62

| Column Name | Type and Maximum Length |
|---|---|
| Invoice Number 41 | Auto-increment |
| Identification of Vendor 43 | Char 8 (K) |
| Invoice Date 45 | Date (K) |
| Vendor Assigned Customer Number 27 | Char 50 |
| Payment Type Requested | Char 10 |
| Payment Transaction Code | Char 10 |
| Vendor Bank Code | Char 12 |
| Vendor Account Number | Char 35 |
| Services Gross Amount for Invoice | 999999999999.99 |
| Services Discount Amount for Invoice | 999999999999.99 |
| Services Net Amount for Invoice | 999999999999.99 |
| Goods Gross Amount for Invoice | 999999999999.99 |
| Goods Discount Amount for Invoice | 999999999999.99 |
| Goods Net Amount for Invoice | 999999999999.99 |
| Total Gross Amount for Invoice | 999999999999.99 |
| Total Discount Amount for Invoice | 999999999999.99 |
| Total Net Amount for Invoice | 999999999999.99 |
| Currrency | Char 3 |
| Text | Char 300 |
| Spend Management Comment 47 | 999999999999.99 |
| Spend Management Resultant Value 49 | 999999999999.99 |

Figure 9a

Line Item Table 37

| Column Name | Type and Maximum Length |
|---|---|
| Line Item Number 35 | Auto-increment |
| Identification of Vendor 43 | Char 8 (K) |
| Invoice Number 41 | Char 50 (K) |
| Invoice Date 45 | Date (K) |
| Goods or Services | Char 1 ('G' or 'S') |
| Gross Item Amount | 999999999999.99 |
| Discount Item Amount | 999999999999.99 |
| Net Item Amount | 999999999999.99 |
| Item Description | Char 300 |
| Units | 999999999999.99 |
| Unit Price | 999999999999.99 |
| Unit Type | Char 20 |
| Percentage of Completion | 999999999999.99 |
| Spend Management Comment 34 | Char 300 |
| Spend Management Resultant Value 36 | 999999999999.99 |

Figure 9b

Remittance Summary Table 39

| Column Name | Type and Maximum Length |
| --- | --- |
| Remittance Transaction Number 33 | Auto-increment |
| Payment Number 31 | Char 50 (K) |
| Vendor ID 29 | Char 8 |
| Payment Date 32 | Date |
| Payment Type | Char 10 |
| Transaction Code | Char 10 |
| Vendor Bank Code | Char 12 |
| Vendor Account Number | Char 35 |
| Gross Payment Amount | 999999999999.99 |
| Total Discount | 999999999999.99 |
| Payment Amount | 999999999999.99 |
| Currency | Char 3 |
| Text | Char 300 |

Figure 9c

Remittance Detail Table 51

| Column Name | Type and Maximum Length |
| --- | --- |
| Payment Key Field | Auto-increment |
| Remittance Transaction Number 33 | Char 50 (K) |
| Vendor ID 29 | Char 8 |
| Invoice Number 35 | Char 50 (K) |
| Payment Date | Date (K) |
| Gross Invoice Amount | 999999999999.99 |
| Total Discount | 999999999999.99 |
| Invoice Amount Paid 53 | 999999999999.99 |

Figure 9d

| Client Transaction Definition X 198 | Normalized Field ID 202 | Required? 136 | Import Mapping Rules 200 |
|---|---|---|---|
| Segment ID | | | |
| Element | Field 1 | Yes | Truncate Left |
| Element | Field 7 | Yes | Truncate Right |
| Element | Field 9 | Yes | |
| . | . | | |
| . | . | | |
| . | . | | |
| Segment ID | | | |
| Element | Field 10 | Yes | 2 Most Significant Digits |
| Element | Field 10 | Yes | 2 Least Significant Digits |
| Element | Field 12 | Yes | |
| . | . | | |
| . | . | | |
| . | . | | |
| Segment ID | | | |
| . | . | | |
| . | . | | |
| . | . | | |

Figure 12

M. F. Evaluation Table 70

| Column Name | Type and Maximum Length |
|---|---|
| Rule Number 239 | Auto-increment |
| First Rule Key 240 | Char 1 |
| Vendor Code 241 | Char 8 |
| Application Code 242 | Char 2 |
| Mathematical Operand ID 243 | Char 1 |
| Value Type ID 244 | Char 1 |
| Value (character) 246 | Char 300 |
| Value (numerical) 248 | 999999999999.99 |
| Last Rule Key 252 | Char 1 |
| Boolean Operand ID 245 | Char 1 |
| Boolean Rule Number ID 247 | 999999999999.99 |
| True Action Code 249 | Char 1 |
| False Action Code 250 | Char 1 |
| Line Item ID 251 | Char 1 |

Trending Analysis Table 401

| Column Name | Type and Maximum Length |
|---|---|
| Trending Analysis Number 403 | Auto-increment |
| Vendor ID 43 | |
| Invoice Data Point Type Key 405 | |
| Line Item Data Point Type Key 407 | |
| Evaluation Type Key 409 | |
| Transaction Identifier Key 411 | |
| First Parameter Key 413 | |
| Last Parameter Key 415 | |
| Boolean Operand ID 417 | |
| Boolean Analysis Number 419 | |
| True Action Code 421 | |
| False Action Code 423 | |

Figure 18

| Application Code 242 | |
|---|---|
| Application Code | Description |
| 01 | Apply to All Line Items |
| 02 | Apply to All Goods |
| 03 | Apply to All Services |
| 04 | Apply to Description XYZ |
| ⋮ | |
| n | Description |

Figure 20

| Mathematical Operand ID 243 | |
|---|---|
| Operand ID | Description |
| 01 | Greater Than |
| 02 | Greater Than or Equal To |
| 03 | Less Than |
| 04 | Less Than or Equal To |
| 05 | Equal To |
| ⋮ | |
| n | Description |

Figure 21

| Action Codes | Action |
|---|---|
| 01 | Write First "Predefined Message" to Comment Field |
| 02 | Write Second "Predefined Message" to Comment Field |
| 03 | Generate Remittance Transaction |
| 04 | Adjust Line Item Field |
| 05 | Write " X% Deviation from Previous " Update Value 292 |
| 06 | Write Resultant Value to Line Item Resultant Value Field |
| 07 | Write Resultant Value to Invoice Resultant Value Field |

Figure 22

| Boolean Operand ID 261 | Operand |
|---|---|
| 01 | AND |
| 02 | OR |
| 03 | XOR |

Figure 23

Invoice Data Point Type Table

| Invoice Data Point Type Key 316 | Invoice Data Point Type |
|---|---|
| 01 | Line Item |
| 02 | Services Gross Amount for Invoice |
| 03 | Services Net Amount for Invoice |
| 04 | Goods Gross Amount for Invoice |
| 05 | Goods Net Amount for Invoice |
| 06 | Total Gross Amount for Invoice |
| 07 | Total Net Amount for Invoice |

Figure 25

Line Item Data Point Type Table

| Line Item Data Point Type Key 318 | Line Item Data Point Type |
|---|---|
| 01 | Invoice Level |
| 02 | Gross Item Amount |
| 03 | Net Item Amount |
| 04 | Units |
| 05 | Unit Price |
| 06 | Percentage of Completion |
| 07 | ... |

Figure 26

Transaction Identifier Key Table

| Transaction Identifier Key 322 | Included Invoices |
|---|---|
| 01 | One Most Recent Invoice |
| 02 | Two Most Recent Invoices |
| 03 | X Most Recent Invoices |
| 04 | YTD Invoices |
| 05 | |
| 06 | |

Figure 27

Evaluation Type Table

| Evaluation Type Key 320 | Evaluation Type Threshold |
|---|---|
| 01 | True if Greater Than Slope of Best Fit Line Through Data Points |
| 02 | True if Greater Than Average of Data Points |
| 03 | True if Greater Than Menu of Data Points |

Figure 28

ELECTRONIC TRANSACTION PROCESSING SERVER WITH AUTOMATED TRANSACTION EVALUATION

TECHNICAL FIELD

The present invention relates to a financial transaction management system, and more particularly, to an invoice transaction system for receiving, automated validation, automated evaluation, and approval of invoice data.

BACKGROUND OF THE INVENTION

Various internet-based electronic invoice processing systems are known in the art whereby a vendor can electronically create and present a bill to a customer for review. It is envisioned that such electronic systems would displace traditional paper-based billing systems wherein a vendor prints and mails an invoice to a customer.

However, widely divergent accounts receivables systems and accounts payables systems have prevented electronic invoicing from becoming ubiquitous. Even with development of standards such as EDI and XML, extensive customization is needed to configure the interface between each vendor and each customer accounting system for the exchange of invoice data. As a result, only customers with considerable influence over their vendors have been able to persuade the majority of their vendors to comply with their electronic invoicing requirements.

Due to the structural problems inherent to electronic invoicing, the most common means for a vendor to send invoice data to a customer remains: i) traditional printing and mailing of a paper invoice to the customer; and ii) generation of an electronic image (such as PDF, Tiff, or other) of an invoice (e.g. an electronic image representation of a printed invoice) for emailing to the customer.

Manual data entry remains the most common means for a customer to enter invoice data into its accounting systems. If a paper invoice is received, a human operator will typically key the invoice data into manual data entry (MDE) screens of the accounting system. If an electroning image (PDF, Tiff, or other) of an invoice is received, it is typically printed to paper form and then a human operator keys the invoice data into the MDE screens of the accounting system.

Accordingly, there is a need in the art for an invoice transaction system for automating the process of receiving invoice data. Further, there is a need in the art for such invoice transaction system to further facilitate, on an automated bases, validation and substantive evaluation of the invoice data.

SUMMARY OF THE INVENTION

A first aspect of the present invention comprises an invoice processing system for receiving, validating, and evaluating a corporation's invoices. The invoice processing system may comprise a document work flow system and an invoice hub. The document work flow system and the invoice hub may be co-located or remotely located and interconnected by a wide area network connection.

The document work flow system receives invoice data embodied in a document image. The document image may be either a printed paper invoice or an image file such as .tif or .pdf which is an electronic representation of the invoice.

Further, in the embodiment wherein the invoice document is received as a paper invoice, an imaging system converts the contents of the paper invoice document to an electronic representation of the document image. Again, the electronic representation may be an image file such as tif or .pdf.

A character recognition system receives the electronic representation of the document image, performs OCR conversion, and generates a data file which represents the invoice data embodied in the document image.

The data file comprises a plurality of data fields. Each data field comprises a data field value. The character recognition system determines each data field value by: i) determining field marker characters associated with a data field; ii) recognizing the field marker characters within the electronic image; iii) identifying a field value location within the electronic image; iv) recognizing characters located within the field value location to determine the data field value; and v) writing the data field value with the data field of the data file. The field value location may be within a predetermined displacement form the field marker characters within the image.

A data field value validation engine determines, for each data field, a data field value rule associated with such data field. The rule is applied to the data field value to distinguish between a valid data field value and suspect data field value. A valid data field value consists of a data field value which complies with the validation rule. A suspect data field value consists of a data field value which fails to comply with the validation rule.

A correction center (or otherwise known as an exception handling center): i) displays a combination of at least a portion of the document image which includes the field value location in combination with the suspect data field value or identification of the suspect data field; ii) receives user input of a replacement data field value to replace the suspect field value as the data field value; and iii) generates a validated invoice file by modifying the invoice transaction file to reflect the replacement field value being substituted for the suspect field value as the data field value. The user input of the corrected value may be provided by at least two independent users to improve accuracy.

The invoice hub receives the data file which includes all validated data field values and stores the invoice data in a transaction database in a normalized format.

A spend management database comprises a plurality of evaluation parameter sets for automatically evaluating invoice data in the transaction database on a substantive basis. Each evaluation parameter set comprises at least: i) identification of a vendor class to which the evaluation parameter set applies; ii) identification of an invoice line item class to which the evaluation parameter set applies; iii) an evaluation function; and iv) at least one indicator of a defined action associated with a defined function result.

A spend management evaluation module selects at least one record of invoice data which represents an amount invoiced by a vendor that is both: i) associated with a vendor within the vendor class of a selected one of the evaluation parameter sets; and ii) associated with a line item that is within the line item class of the selected one of the evaluation parameter sets.

The spend management module then performs the evaluation function of the selected one of the evaluation parameter sets on at least one record of invoice data to generate a resulting value. Based on the resulting value, the spend management module may determine an evaluation field value (which may also be referred to as a comment) in accordance with the defined action associated with the resulting value. The evaluation field value, or comment, is then associated with at least one record of invoice data.

The session management module establishes a secure session with a client system and provides an invoice file through the second secure session. The invoice file comprises both at least one record of invoice data and the evaluation field value.

For purposes of configuring the spend management parameters, the session management module may further: i) establish a second secure session with the client system; ii) obtain at least one evaluation parameter set from the client system through the second secure session; and iii) write at least one evaluation parameter set to the spend management database.

In one sub embodiment the evaluation function of at least one evaluation parameter set may be a threshold evaluation function. In such sub embodiment, at least one evaluation parameter set further comprises a threshold value and a mathematical operand. Further, at least one indicator of a defined action associated with a defined function result comprises: i) a true action indicator of a true action associated with a defined function result of true; and ii) a false action indicator of a false action associated with a defined function result of false.

The true action comprises defining a first auto analysis comment to be associated with the evaluation field in the event that the spend management evaluation module determines that comparison of a field of the record of invoice data to the threshold value using the mathematical operand generates a function result of true.

The false action defining a second auto analysis comment to be associated with the evaluation field in the event that the spend management evaluation module determines that comparison of a field of the record of invoice data to the threshold value using the mathematical operand generates a function result of false.

In another embodiment, the spend management database may link a first evaluation parameter set to a second evaluation parameter set by a Boolean logic function. The first evaluation parameter set is a first one of the plurality of evaluation parameter sets. The second evaluation parameter set is a second one of the plurality of evaluation parameter sets. The first evaluation parameter set and the second evaluation parameter set include the same values for identification of a vendor class and identification of an invoice line item class.

At least one defined action of the first evaluation parameter set comprises a true action and a false action. The true action defines input of a true value to the Boolean logic function and the false action defines input of a false value to the Boolean logic function.

Similarly, at least one defined action of the second evaluation parameter set comprises a true action and a false action. The true action defines input of a true value to the Boolean logic function and the false action defines input of a false value to the Boolean logic function.

In this embodiment, performing the evaluation function of the selected one of the evaluation parameter sets on at least one record of invoice data to generate a resulting value comprises: i) performing the evaluation function of the first evaluation parameter set on at least one record of invoice data to generate a first sub-resulting value consisting of one of a true value and a false value; ii) performing the evaluation function of the second evaluation parameter set on at least one record of invoice data to generate a second sub-resulting value consisting of one of a true value and a false value; and iii) using the first resulting value and the second resulting value as input to the Boolean logic function to generate the resulting value.

In either of the above described embodiments, the evaluation value (of one of the evaluation parameter sets) may be, for example, a predetermined price. In which case, at least one of the true action and the false action comprises writing an indication that that the value of the line item is in excess of the predetermined price.

Another evaluation value may be, for example a predetermined quantity. In which case, at least one of the true action and the false action comprises writing an indication that that the quantity of items is in excess of the predetermined quantity.

For a better understanding of the present invention, together with other and further aspects thereof, reference is made to the following description, taken in conjunction with the accompanying drawings. The scope of the invention is set forth in the appended claims.

BRIEF DESCRIPTION OF THE DRAWINGS

FIG. 2 is a diagram representing a document image in accordance with one embodiments of the present invention;

FIG. 3 is a table representing association of recognized characters with position within a document image in accordance with one embodiment of the present invention;

FIG. 6 is an exemplary custom image library in accordance with one embodiment of the present invention;

FIG. 7 is an exemplary validation rules database in accordance with one embodiment of the present invention;

FIG. 8 is a representation of a user interface of a correction center in accordance with one embodiment of the present invention;

FIG. 9a is an exemplary table of a transaction database in accordance with one embodiment of the present invention;

FIG. 9b is an exemplary table of a transaction database in accordance with one embodiment of the present invention;

FIG. 9c is an exemplary table of a transaction database in accordance with one embodiment of the present invention;

FIG. 9d is an exemplary table of a transaction database in accordance with one embodiment of the present invention;

FIG. 12 is a table representing exemplary element mapping of a transaction to the format of the transaction database in accordance with one embodiment of the present invention;

FIG. 18 is a table diagram representing an exemplary evaluation table in accordance with one embodiment of the present invention;

FIG. 20 is a table representing exemplary rule application codes in accordance with one embodiment of the present invention;

FIG. 21 is a table representing exemplary mathematical operand codes in accordance with one embodiment of the present invention;

FIG. 22 is a table representing exemplary action codes in accordance with one embodiment of the present invention;

FIG. 23 is a table representing exemplary Boolean operand codes in accordance with one embodiment of the present invention;

FIG. 25 is a table representing exemplary invoice data point type keys in accordance with one embodiment of the present invention;

FIG. 26 is a table representing exemplary line item data point type keys in accordance with one embodiment of the present invention;

FIG. 27 is a table representing exemplary transaction identifier keys in accordance with one embodiment of the present invention;

FIG. 28 is a table representing exemplary evaluation type keys in accordance with one embodiment of the present invention;

DETAILED DESCRIPTION OF THE INVENTION

Figure 1:
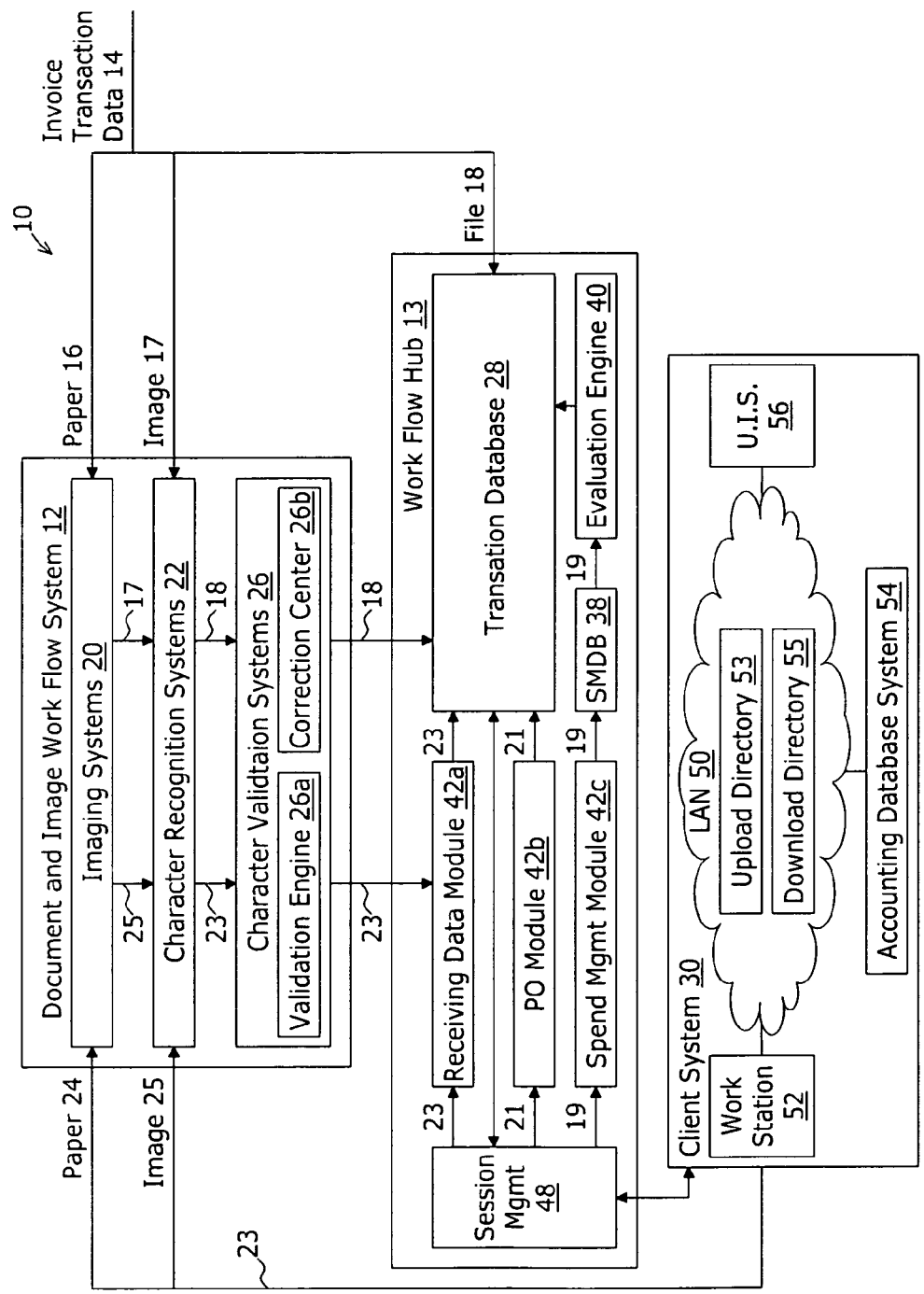
FIG. 1 is a block diagram of an automated invoice transaction system in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

Invoice Transaction System Overview

FIG. 1 illustrates exemplary architecture of an invoice transaction system 10 in accordance with one embodiment of the present invention.

The system 10 may comprise one or more document and image file work flow systems 12, and one or more work flow hubs 13. In general, the document and image file work flow system 12 receives invoice transaction data 14 in the form of document images including paper invoices 16 or electronic invoice image files 17 and generates invoice data files 18 representative of the invoice transaction data 14 therein.

The work flow hub 13 obtains invoice transaction data 14, formatted as a data file 18, from the document and image file work flow system 12, from remote invoicers (not shown), and/or from client systems 30. The invoice transaction data 14 is stored in a transaction database 28.

A session management module 48 provides a web based interface between workstations 52 and unattended interface stations 46 of the client systems 30 and the work flow hub 13 to enable client processing of invoice data 14 stored in the transaction database 28.

In more detail, the session management module 48 operates as a traditional web server for interacting with each workstation 52 to enable an operator of the workstation 52 to perform invoice management tasks—including the exchange of data files between the session management module 48 and an accounting database system 54 of the client 30.

The session management module 48 operates as an event management controller for interacting with each unattended interface station 56 to facilitate the exchange of data files between the session management module 48 and the accounting database system 54 of the client 30.

With specific respect to interaction with an unattended interface station 56 of a client 30, upon logon and authentication of an unattended interface station 56, the session management module 48 provides: i) a schedule of upload events and download event applicable to the unattended interface station 56; ii) identifies, for each upload event, the particular upload directory 53 wherein the unattended interface station 56 is to locate a file for automated transfer to the session management module 48 through the secure session; iii) identifies, for each download event, the particular download directory 55 wherein the unattended interface station 56 is to write a file received from the session management module 48; and iv) executes the scheduled upload events and download events in conjunction with the unattended interface station 56.

A more detailed discussion of exemplary operation of the unattended interface station 56, operation of the session management module 48 for interaction with the unattended interface station 56, password control and security of an unattended interface station 56, event scheduling, and other operations is described in U.S. patent application Ser. No. 10/879,237 entitled A Transfer Client of a Secure System for Unattended Remote File and Message Transfer, filed on Jun. 29, 2004 and assigned to the same assignee as the present invention. The contents of such patent application are hereby incorporated by referenced.

A receiving data module 42a obtains receiving document data 23 from a workstation 52 or unattended interface station 56 through the session management module 48 and populates such receiving document data 23 into records and fields of the transaction database 28 to indicate receipt of the products being invoiced. In a sub embodiment of the present invention, receiving document data in the form of a document image (either a paper receiving document 24 or an image file 25) may be provided to the document and image work flow system 12 which generates data files representative of the receiving document data 23 therein for writing to records and fields of the transaction database 28 to indicate receipt of the products being invoiced.

A purchase order module 42b obtains purchase order data 21 from a workstation 52 or unattended interface station 56 through the session management module and populates such purchase order data 21 into records and fields of the transaction database 28 in association with the invoice data 14.

A spend management module 42c, spend management database 38, and an evaluation engine 40, in combination, apply spend management parameters 19 to substantively evaluate the invoice data 14 on an automated basis. A more detailed discussion of these elements and their interaction is included herein.

Although FIG. 1 represents the document and image work flow system 12 co-located with the work flow hub 13, it would be appreciated that an invoice transaction system 10 may include multiple document and image work flow systems 12 and/or multiple work flow hubs 13 co-located or located at separate facilities with the data connections described herein being implemented across wide area networks such as the Internet.

Document Image and Work Flow System Detail

In the exemplary embodiment, the document and image file work flow system 12 includes one or more imaging systems 20 for converting the contents of paper invoices 16 to an electronic invoice image files 17.

Each imaging system 20 may comprise one or more devices commonly referred to as "Scanners" which image a paper document and generate a PDF, TIF, TIFF, or similarly formatted image file.

In the exemplary embodiment, paper invoices 16 are received at a post box uniquely associated with a client such that the postal employees, by virtues of delivering the mail to the correct post box, sort the invoices by client. This enables batch imaging of all invoices received for a particular client without having to perform manual sorting at the scanning facility.

A character recognition system 22 receives each the electronic invoice image file 17 (either as received by the document and image file work flow system 12 or as generated by the imaging system 20 if a paper invoice 16 is received by the document and image file work flow system 12) and converts the invoice data 14 represented by the image into an electronic invoice transaction data file 18.

Turning briefly to FIG. 2, an exemplary image file 17 is shown in graphic form. It should be appreciated that the image file 17, in graphic form, appears as the paper invoice 16 which was input to the imaging system 20. The character recognition system 22 recognizes each character in the image and associates the character (or group of characters) with a position within the image. Referring briefly to the table of FIG. 3 in conjunction with FIG. 2, an ASCII value 96 for each recognized character (or the ASCII values for a group of characters recognized) may be associated with a coordinate value 98/100 (within an X/Y Cartesian coordinate system 73 overlaid over the image) of the characters location within the image.

For example, the word "Invoice:" 68 appears within the image file 17 at a certain coordinate (approximately 1, 6.25 in this example). The character recognition system 22 associates the ASCII values for the characters of "Invoice" with the coordinates.

Characters "0534" (reference numeral 70) appear within the image at a certain coordinate (approximately 2.25, 6.25 in this example).

The word "Date:" 72 appears at certain coordinates (approximately 3.75, 6.25 in this example). The character recognition system associates the ASCII values for the characters of "Invoice" with the coordinates.

Characters "01/15/06," 74 appear within the image at certain coordinates (approximately 4.25, 6.25 in this example). The character recognition system associates the ASCII values for the characters of "Invoice" with the coordinates.

The characters "PO:" 76 appear at certain coordinates (approximately 5.75, 6.25 in this example). The character recognition system associates the ASCII values for the characters of "Invoice" with the coordinates.

The characters "15742" 78 appear at certain coordinates (approximately 2.25, 6.75, 6.25 in this example). The character recognition system associates the ASCII values for the characters of "Invoice" with the coordinates.

Figure 4:
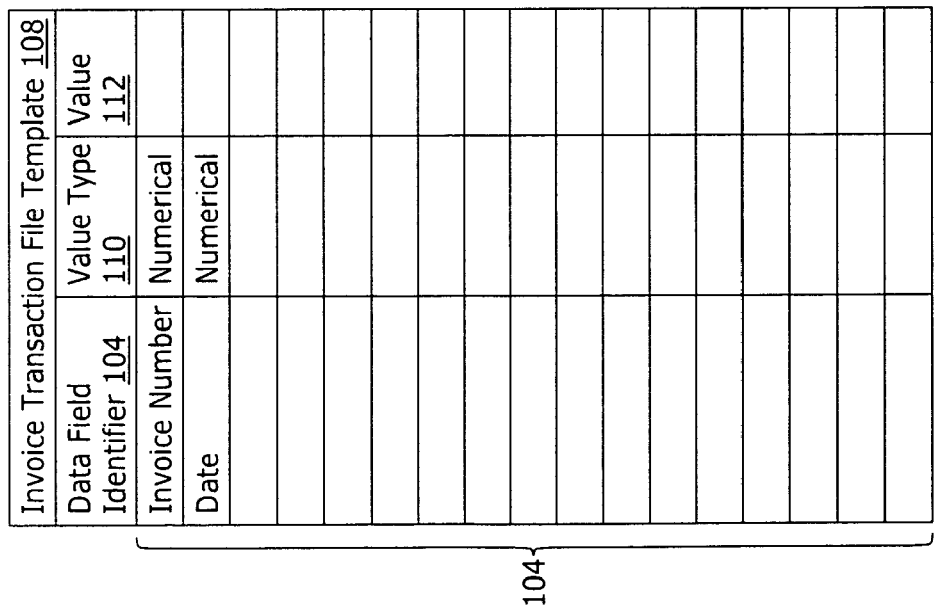
FIG. 4 is a diagram representing a transaction file template in accordance with one embodiment of the present invention.

After recognizing characters, the character recognition system 22 generates an invoice transaction data file 18 by populating values into a file template 108. Turning briefly to FIG. 4 in conjunction with FIG. 1 and FIG. 2, an invoice transaction file template 108 is shown in table form. The template includes a plurality of data field identifiers 104 and a value type 110 associated with each data field identifier 104. An invoice transaction file 18 is generated by associating a value 112 (compliant with the value type 110) with each data field identifier 104.

To perform this process, the character recognition system 22 identifies, for each data field identifier 104: i) a set of ASCII characters 96 recognized within the image which correspond to field marker characters; and ii) a set of ASCII characters 96 recognized in the image as a value to associate with the data field identifier 104 by its proximity to the field marker characters.

Figure 5:
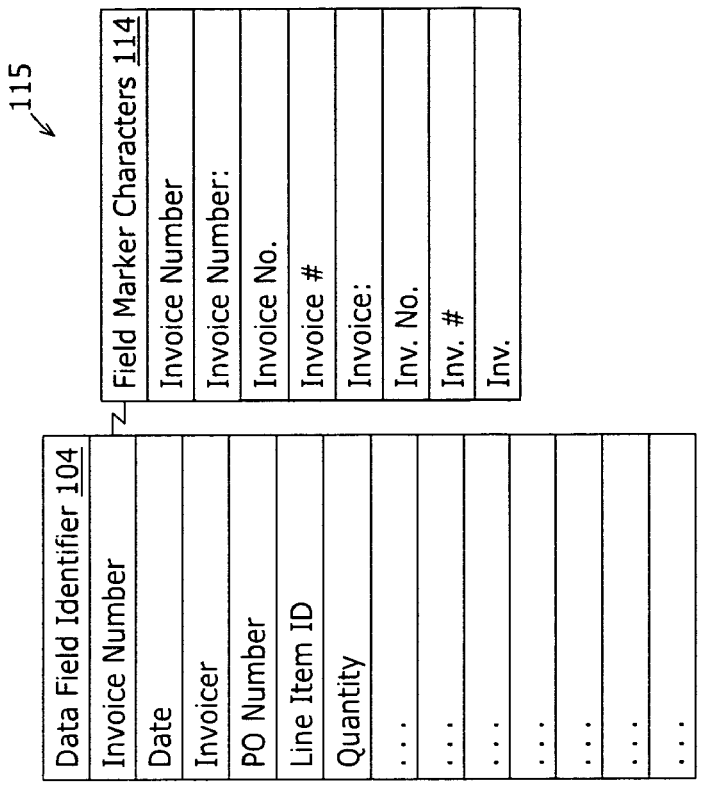
FIG. 5 is an exemplary field marker character database in accordance with one embodiment of the present invention.

Turning briefly to FIG. 5, an exemplary field marker database 115 which associates various field marker characters 114 with each of a plurality of data field identifiers 104 is shown.

For example, the data field identifier "Invoice Number" is associated with the following field marker characters "Invoice Number", "Invoice Number:", "Invoice No.", "Invoice #", "Invoice:", "Inv. No.", "Inv. #", and "Inv:".

The character recognition system 22 identifies the field marker characters 114 that are within the image file 17 and are associated with the data field identifier 104. The character recognition system 22 then identifies the field value associated with the data field identifier 104 by identifying the character set located within a field value location. The field value location is a predetermine displacement form the field marker characters 114. The predetermined displacement is generally a displacement to the right of the field marker characters 114 or below the field marker characters 114.

In the example invoice image shown in FIG. 2, the data field identifier of Invoice Number has field marker characters "Invoice:" associated therewith in the field marker database 115 of FIG. 5. The character string "Invoice:" is located within the image file 17 at coordinates of approximately 1, 6.25. The character recognition system recognizes an ASCII value located to the right of, or below the coordinate 1, 6.25 as the field value to associate with the data field identifier "Invoice number" in the invoice transaction file 18 built in accordance with the template 108. In this example, that is the ASCII character set "0534". Further, if the value type 110 associated with the data field identifier 104 indicates that the value should be numerical rather than ASCII, the character recognition system 22 converts the ASCII value to a numerical value before populating into the value field 112 of the invoice transaction file 18 built in accordance with the template 108. This process is repeated for all data fields of the invoice transaction file template 108.

In another aspect of the present invention, in addition to recognizing ASCII characters, the character recognition system 22 may recognize custom images such as a logo 65 or an address block 67 written in a logo format, non-traditional font, or otherwise in a manner wherein traditional character recognition of ASCII characters is not practical.

Turning briefly to FIG. 6, a library 105 of custom images 102 is shown in table format. Each custom image 102 is represented by a record 107 which associates the custom image 102 with one or more data field identifiers 104 and a corresponding ASC II character string 106 which is a field value to associate with the data field identifier.

When a custom image 102 is recognized within an image file 17, the ASCII character values 106 associated with the data field identifier 104 are populated into the corresponding field (e.g. same data field identifier 104) of the data file 18 built in accordance with the invoice transaction template 108.

For example, if the custom character 60 (a logo) is recognized within the image file 17, values for a supplier name, street address, city, state, and zip code are populated into applicable fields of the data file 18 based on data field identifiers 104 in the custom image library 105 matching data field identifiers 104 in the template 108.

Returning to FIG. 1, because electronic character recognition systems have inherent inaccuracies, a character validation system 26 is used to increase the accuracy of characters in the electronic invoice file 18. The character validation system may comprise a validation engine 26a and a correction center 26b.

The validation engine 26a receives each invoice transaction file 18 and applies data field value rules to distinguish between valid data field values and suspect data field values. In more detail, a valid data field value is a value which complies with the validation rule. A suspect data field value is a value which fails to comply with the validation rule.

Turning briefly to FIG. 7, a validation rules database 116 is shown. The validation database 116 associates each data field identifier 104 with at least one validation rule 118. For example, a validation rule for applying to a PO number data field value may be a rule that requires the value to be 5 digits. Therefore a value other than 5 digits would a suspect value. Similarly, a validation rule for applying to a zip code data field value may be a rule that require the value be 5 digits.

A validation rule for a supplier or vendor name may be that it matches the name of a supplier or vendor existing in a database. A similar rule may apply to the supplier address. If a data field of the invoice transaction file 18 is suspect, at least the portion of the invoice transaction file 18 that identifies the suspect data field and the invoice image file 17 are passed to a correction center 26b.

The correction center 26b displays the invoice image 17 in association with identification 50 of the suspect data field value 59 for a human to manually determine the correct data field value 57 from the image 17 and enter the corrected field value 57 for replacing the suspect field value in the invoice transaction file 18.

Figure 8:
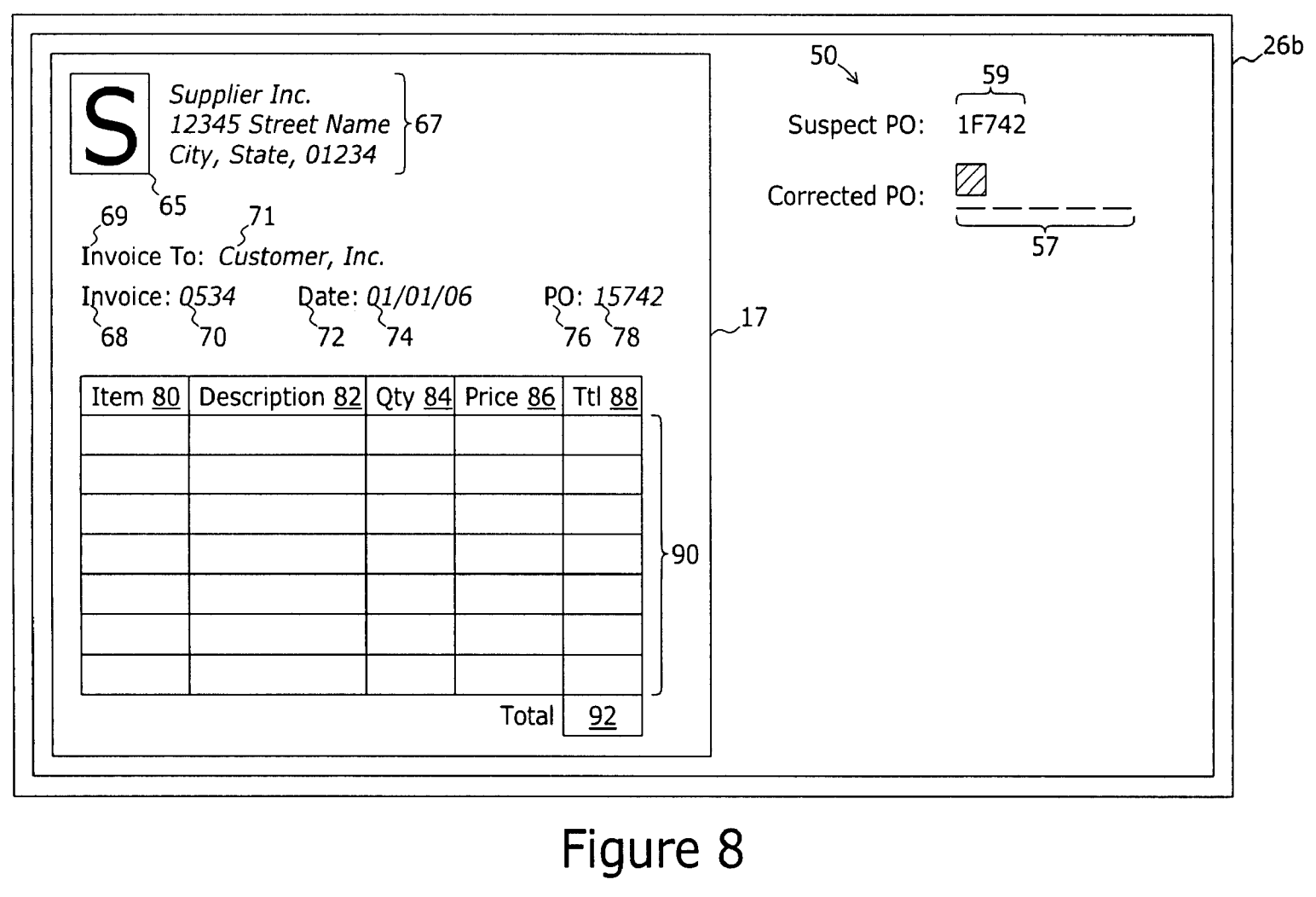

Turning briefly to FIG. 8, in the exemplary embodiment, the correction center 26b includes a display of the invoice image 17 in association with identification 50 of the suspect data field on a user interface display screen. The correction center 26 may receive, from a human operator via the user interface, a corrected value 57 to replace the suspect value 59.

To further improve accuracy, a correction center 26b may obtain corrected values 57 from two or more independent operators before replacing the suspect field value in the transaction file with the corrected field value—and may make such replacement only if the corrected field values 57 entered by each operator match.

After the invoice transaction file 18 is validated (either on initial validation by the validation engine 26a or following correction of suspect fields by the correction center 26b) the validated invoice transaction file 18 is transferred to the transaction database 28 of the work flow hub 13.

In one sub embodiment of the present invention, one or more document and image and work flow systems 12 may further be configured for dematerializing receiving document data 23 in the form paper receiving documents 24 or receiving document image files 25 and converting the contents of such paper receiving documents 24 and receiving document image files 25 to receiving document data files for loading into the transaction database 28 of the work flow hub. The paper receiving documents 24 may be imaged at the clients receiving facility, batch scanned by the client, or batched scanned at a central facility.

In such embodiment, each of the imaging system 20, character recognition system 22, and character validation system 26 operates as discussed with respect to paper invoice documents 15 and invoice document image files 17 but instead operates on the paper receiving documents 24 and the receiving document image files 25.

Transaction Database Detail

In general, the transaction database 28 is a relational database in which the invoice data 14 is recorded. Specific structure of the database 28 is a matter of design choice and the exemplary structure set forth in FIGS. 9a through 9d is only one example of a structure enabling the present invention.

Referring to FIG. 9a, an invoice summary table 62 associates a unique invoice transaction number 41 to each invoice transaction managed by the work flow hub 13. Associated with each unique invoice transaction number 41 are a plurality of fields comprising an identification of the vendor 43, an invoice date 45, and various other fields which comprise data applicable to the invoice. Further, for purposes of implementing the spend management aspects of the present invention, a spend management comment field 47 and a spend management resultant value field 49 may be included.

Because the quantity of line items on an invoice is variable, line item information is stored in a line item table 37 as represented by FIG. 9b. The line item table 37 associates line item detail for each line item (identified by a line item number 35) to the particular invoice using the vendor ID 43, the invoice number 41, and optionally the invoice date 45. Further, for purposes of implementing the spend management aspects of the present invention, a spend management comment field 34 and a spend management resultant value filed 36 may be included in the line item detail.

A remittance summary table 39 of FIG. 9c associates a remittance transaction number 33 to each remittance transaction managed by the work flow hub 13. Associated with the remittance transaction number 33 are a plurality of fields including a payment number 31, a vendor/payee ID 29, payment date 32, and various other information applicable to the payment.

Because each remittance may apply to one or more invoices (in whole or in part), each remittance payment can be considered to have a variable number of line items. As such, remittance line item information that includes identification of the paid invoices is stored in the remittance detail table 51 represented by FIG. 9d. The remittance detail table 51 associates a particular remittance (identified by its remittance transaction number 33) to remittance detail such as the vendor/payee ID 29, invoice number 35 to which at least part of the remittance applies and an invoice amount paid 53.

The invoice data 14 may be written to the transaction database 28 by loader systems (not shown). A loader system translates invoice transaction data 14 of data files 18 to a normalized transaction definition compatible with the structure of the transaction database 28. The loader system enables data files 18 from multiple document and image work flow systems 12 and multiple vendors in varying data file formats to be loaded into the transaction database 28 in a normalized format.

Figures 10, 11A, 11B:
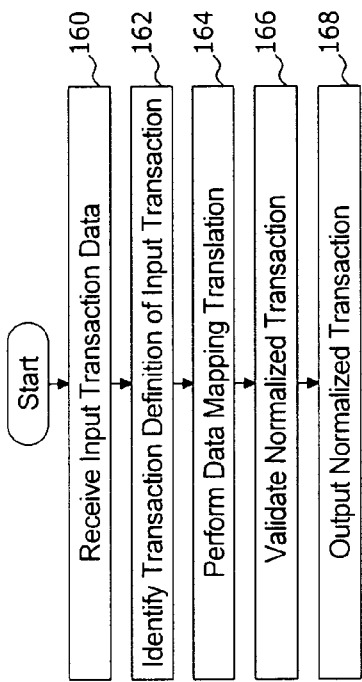
FIG. 10 is a flow chart representing exemplary loading of invoice data into a transaction database in accordance with one embodiment of the present invention.
FIG. 11a represents an exemplary transaction definition in accordance with one embodiment of the present invention.
FIG. 11b represents an exemplary transaction definition in accordance with one embodiment of the present invention.

Referring to FIG. 10, exemplary operation of the loader systems is shown. Step 160 represents receipt of invoice transaction data 14. Referring briefly to FIGS. 11a and 11b, portions of exemplary client transactions in varying formats are represented. Exemplary transaction 182 of FIG. 11a is a comma delimited transaction that includes a plurality of data elements 186a-186n each of which is separated from adjacent data elements 186a-186n by a comma symbol. Each data element 186a-186n is identified by its sequential location within the transaction (e.g. data element 186e which is the 5$^{th}$ data element in the transaction represents invoice date) and includes data that corresponds with transaction format rules. For example, the transaction format rules that correspond to the invoice date may require that the date element 186e contain 6 digits in a MMDDYY format.

Exemplary transaction 184 of FIG. 11b is a tagged data element transaction (e.g XML) that includes a plurality of data elements 188a-188n each of which is positioned following an element tag 190a-190n that identifies the contents of the following data element 188a-188n. Again, the data within each element complies with transaction format rules.

It should be appreciated that the exemplary transactions 182 and 184 each represent only a portion of a transaction. An actual transaction may consist of many more elements and the permutations of client transaction definitions may be large.

Step 162 represents identifying the particular transaction definition with which the received transaction file complies. In the exemplary embodiment, a transaction definition type indicator may be included in the processing call to launch the loader systems. However, it is envisioned that the loader systems may independently determine the transaction definition type of the received invoice transaction file.

Step 164 represents performing data mapping translation. Referring briefly to FIG. 12, to perform data mapping translation, the loader systems rely on a data mapping table 196 for each of the possible client transaction definitions that are stored in a data mapping database. Each data mapping table 196 associates a client transaction field 198 with mapping rules 200 to each field 202 in the normalized transaction. The required field 136 also indicates whether the field is required for purposes of validation. Because each field in a normalized transaction may include data that is only a portion of a field from a client transaction (for example, a client transaction date field may include a month, day, and year organized as MMDDYYYY while the normalized transaction may include three separate fields identified as month, day, and year), the mapping rules 200 may indicate which portion of the client transaction field to map to the normalized transaction field. Because the normalized transaction field may be either longer or shorter than the client transaction filed, the mapping rules 200 may indication which characters to truncate or which characters to add as default characters.

After performing data mapping translation, the normalized data must be validated at step 166. The loader systems validate the normalized transaction by assuring that each field identified as required in the mapping table 196 is included and that the data within each such required field matches field requirements.

Step 168 represents writing the normalized invoice transaction data 14 to the transaction database 28.

Spend Management Module, Spend Management Database, and Evaluation Engine Detail The spend management work flow module 42c enables a user of a workstation 52 to define spend management parameters 19 in the spend management database 38. The spend management parameters 19 may comprises a combination of mathematical function evaluation parameters 19a (e.g. rules) and trending evaluation parameters 19b to be applied to invoice data 14 to be applied to invoice data 14 on a Boolean logic basis.

In general, the spend management work flow module 42a provides a configuration document, such as an HTML document, to a work station 52 of the client through the session management module 48. The document includes fields for user definition of spend management parameters 19 which, after user entry, are posted back to the spend management work flow module 42a and written to the spend management database 38.

Figure 13:
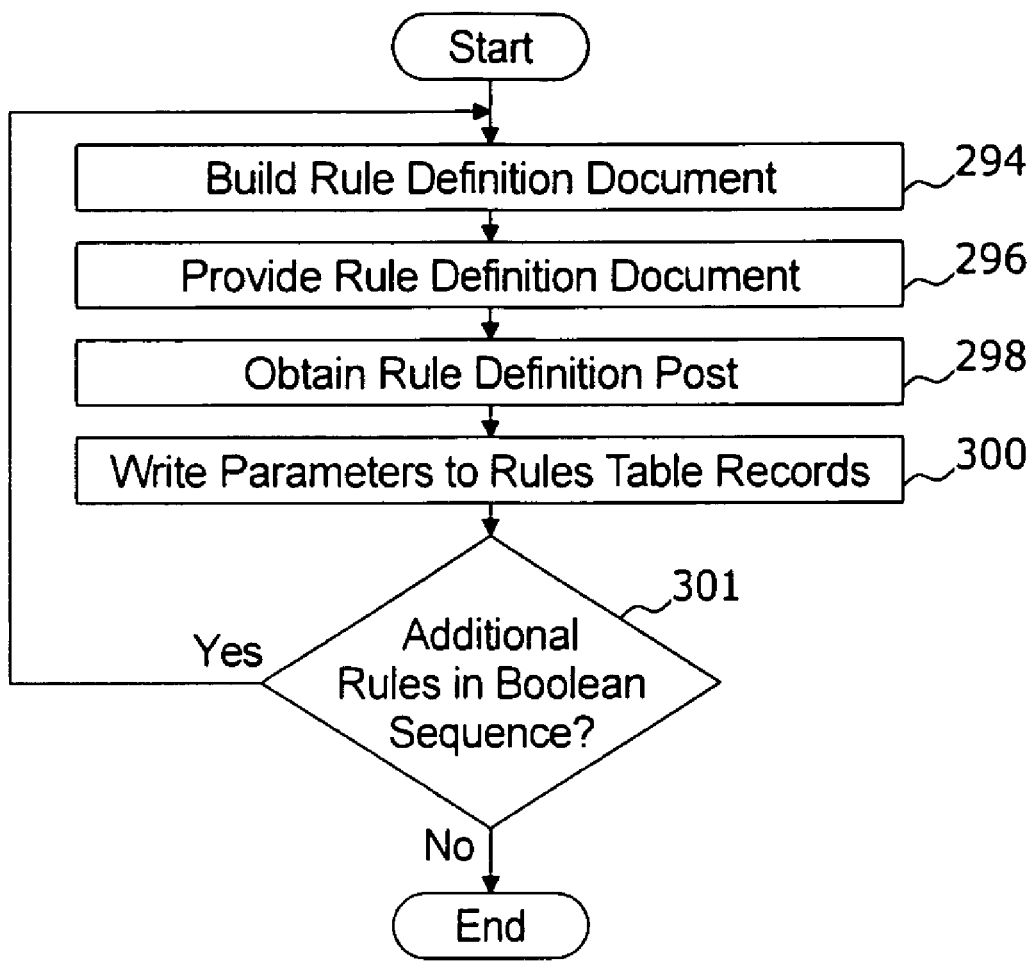
FIG. 13 is a flow chart representing an exemplary workflow script in accordance with one embodiment of the present invention.

FIG. 13 represents exemplary steps performed by the spend management work flow module 42a to obtain client input of a sequence of one or more mathematical function evaluation parameter sets 19a for application to invoice data 14 stored in the transaction database 28.

Figure 14:
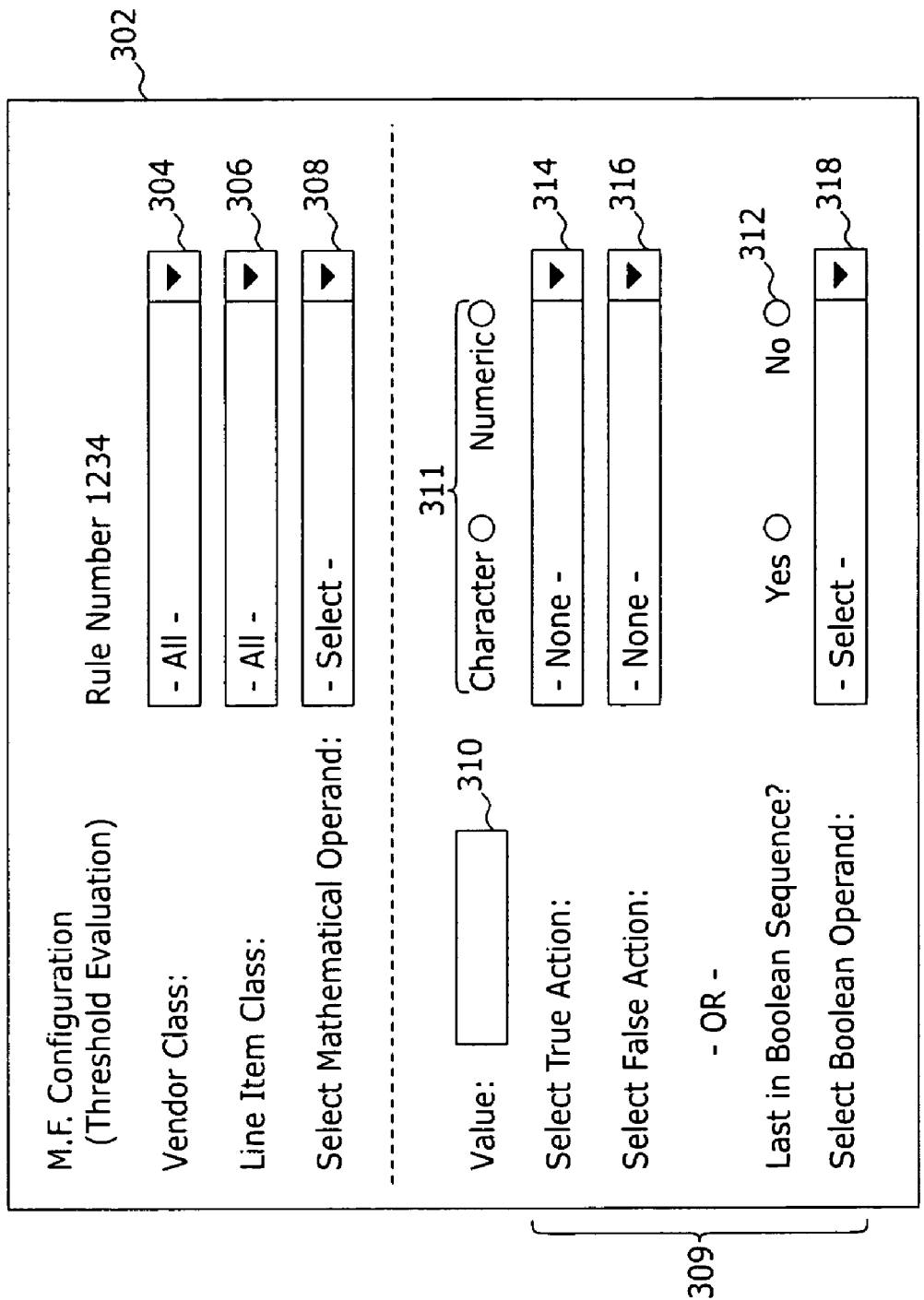
FIG. 14 is an exemplary rules configuration document in accordance with one embodiment of the present invention.

FIG. 14 represents an exemplary configuration document 302 for obtaining user input of a mathematical function evaluation parameter set for an exemplary type of mathematical function evaluation referred to as a threshold evaluation. A threshold evaluation involves comparing a particular element of the invoice data 14 to a predetermined threshold value using a defined mathematical operand to generate a true or false function result. The function result may be: i) used to determine an action such as writing a predefined comment or value to an evaluation field associated with the element of invoice data 14; or ii) combined, on a Boolean basis, with other evaluations to generate a combined function result used to determine an action such as writing a predefined comment or value to an evaluation field associated with the element of invoice data 14.

Referring to FIG. 13 in conjunction with FIG. 14, step 294 represents building the configuration document 302. The configuration document 302 includes: i) a drop down menu 304 listing vendors (that are trading partners with the client) to enable the user of the workstation 52 to define a vendor class to which the evaluation is applicable; ii) a drop down menu 306 listing line items to enable the user of the workstation 52 to define a line item class to which the evaluation is applicable, iii) a drop down menu 308 listing mathematical operands to enable the user of the workstation 52 to define the mathematical operand to use for comparing the invoice data (within the vendor class and line item class) to the threshold value; iv) a field 310 for enabling user input of the threshold value; v) a control 311 for enabling user definition of whether the threshold value is character or numeric; and vi) controls for enabling the user of the workstation 52 to input at least one indicator 309 of a defined action.

The indicator 309 of a defined action may be any of: i) a true action code (defining an action to take in the event that the mathematical evaluation produces a resultant value of true);

ii) a false action code (defining an action to take in the event that the mathematical evaluation produces a resultant value of false); and iii) an indication to combine the result of the mathematical evaluation function with the result of another mathematical evaluation function on a Boolean logic bases.

As such, the exemplary document 302 may include: i) a drop down menu 314 for definition of a true action code; ii) a drop down menu 316 for definition of a false action code; iii) a control 312 for indicating whether the result of the mathematical evaluation function is to be combined with a next mathematical function; and iv) drop down menu 318 for selection of a Boolean operation for combining the result with the result of the next mathematical function.

Step 289 represents obtaining a post from the workstation that includes the selected parameters. Step 300 represents writing the posted parameter set 19a (or an indication of the selected parameters 19a) to the spend management database 38.

Figures 15, 16:
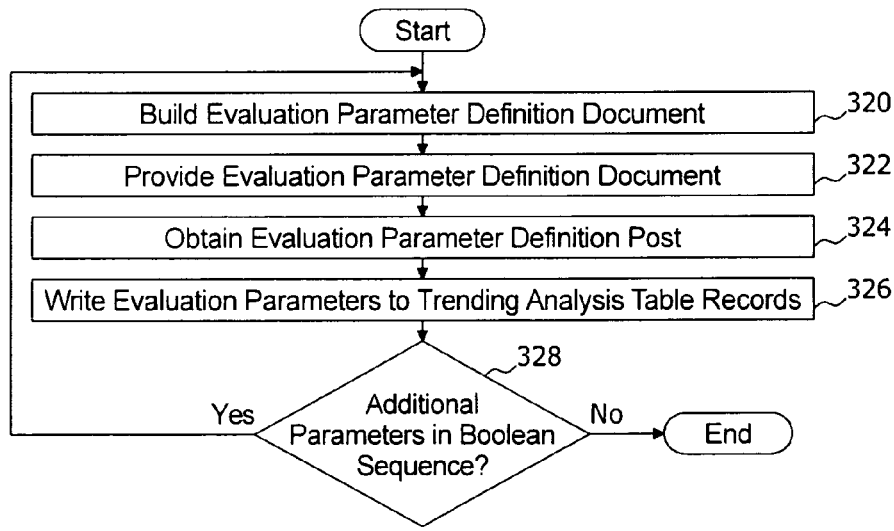
FIG. 15 is a table diagram representing an exemplary evaluation table in accordance with one embodiment of the present invention.
FIG. 16 is a flow chart representing an exemplary workflow script in accordance with one embodiment of the present invention.

Turning briefly to FIG. 15, an exemplary mathematical function evaluation parameter set table 70 of the spend management database 38 is shown. The table 70 associates an identification of each mathematical function evaluation parameter set 19a with the selected parameters.

In more detail, a unique rule number 239 (identifying the evaluation parameter set 19a) is associated with a first rule key field 240, a vendor code 241, an application code 242, a mathematic operand ID field 243, a value type ID field 244, a character value field 246, a numerical value field 248, a last rule key 252, a Boolean operand ID field 245, a Boolean rule number ID field 247, a true action code 249, a false action code 250, and a line item ID field 251. A more detailed discussion of the significance of each value is included in the discussion of the spend management evaluation module 40.

Returning to FIG. 13, at step 301, if the rule was the last in the Boolean sequence, the system terminates rule definition operation. However, if there are additional rules in the Boolean sequence, the system returns to step 294 wherein the steps are repeated for definition of the next rule in the sequence.

FIG. 16 represents exemplary steps performed by the spend management module 42c to obtain client input of trending evaluation parameters 19b for application to invoice data 14 stored in the transaction database 28.

Figure 17:
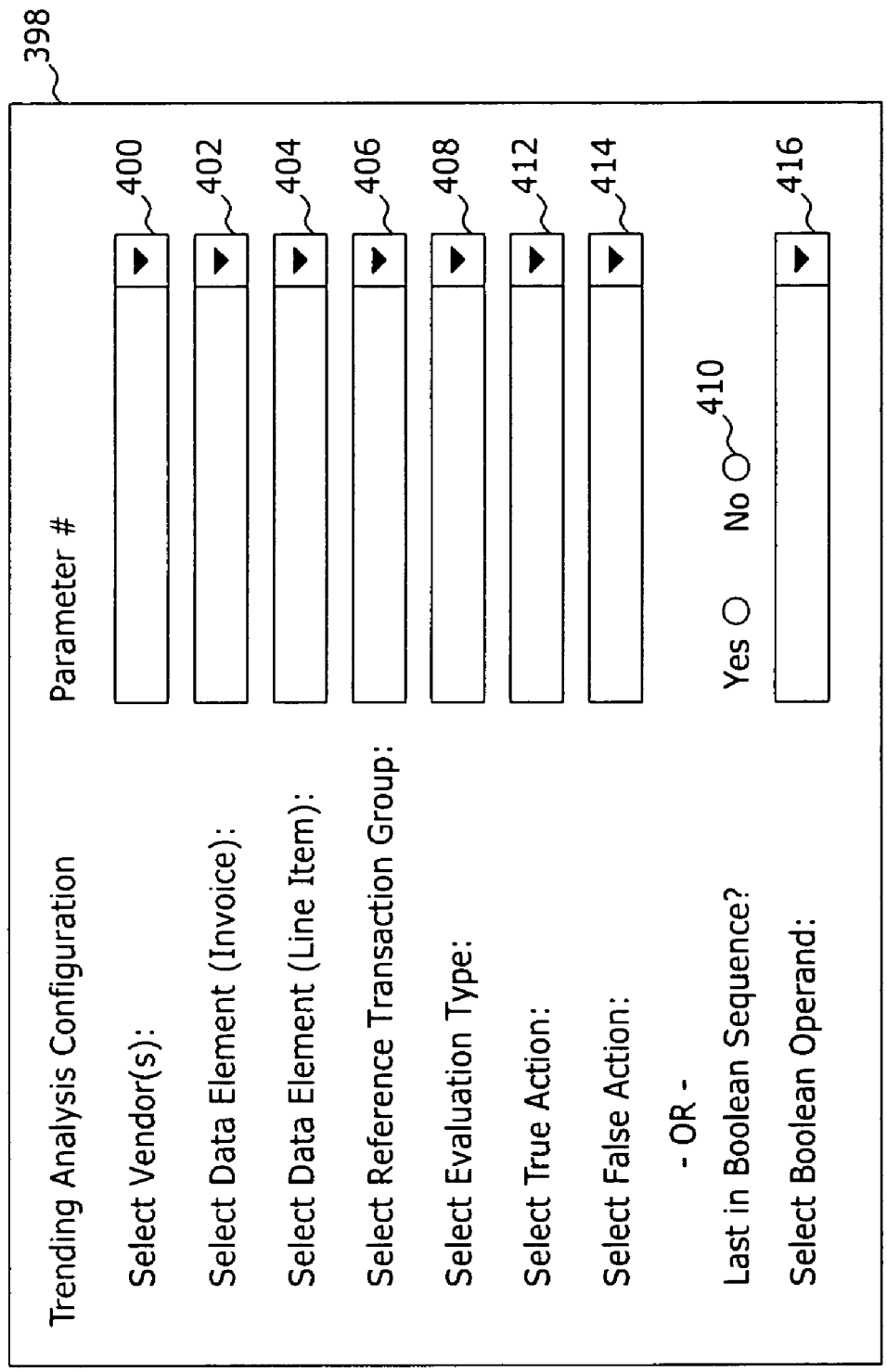
FIG. 17 is an exemplary rules configuration document in accordance with one embodiment of the present invention.

FIG. 17 represents an exemplary configuration document 398 for obtaining user input of an exemplary trending evaluation parameter set.

Referring to FIG. 16 in conjunction with FIG. 17, step 320 represents building the trending analysis configuration document 398 and step 322 represent providing such document to the workstation 52.

More specifically, the trending evaluation configuration document 398 may be an HTML document which includes: a) field 400 which is a menu bar drop down list of vendors (that are trading partners with the client) for selection of the vendor(s) to which the trending evaluation parameter set 19b will apply; b) field 402 which is a menu bar drop down list of invoice level data elements to which the trending evaluation parameter set 19b will apply; c) field 404 which is a menu bar drop down list of line item level data elements to which the evaluation parameter set will apply; d) field 406 which is a menu bar drop down list of reference transaction groups; e) field 408 which is a menu bar drop down list of evaluation functions; and f) fields 410, 412, 414, and 416 which may be menu bar drop down lists or other controls for selection of true actions and false actions to be taken based on the evaluation result and/or combination of the evaluation result with other evaluation results on a Boolean logic basis.

Step 324 represents obtaining a post from the workstation 52 that includes the selected trending analysis parameters from the trending analysis parameter document 398. Step 326 represents writing the trending analysis parameters 19b (or an indication of the selected parameters 19b) to the spend management database 38

Turning briefly to FIG. 18, an exemplary trending evaluation parameters table 401 of the spend management database 38 is shown. The trending analysis rules table 401 associates identification of each trending analysis parameters 19b with the selected parameters.

In more detail, a unique trending analysis number 403 (identifying the trending analysis parameter set 19b) is associated with a vendor ID 43, an invoice data point type key 405, and line item data point type key 407, an evaluation type key 409, a transaction identifier key 411, a first parameter key 413, a last parameter key 415, a Boolean operand ID key 417, a Boolean analysis number 419, a true action code 421, and a false action code 423. A more detailed discussion of the significance of each value is included in the discussion of the evaluation engine 40 (FIG. 1).

Returning to FIG. 1, as discussed, the evaluation engine 40 applies spend management parameters 19 to invoice data 14. In more detail, the evaluation engine 40 applies the spend management parameters 19 stored in the spend management database 38 to generate spend management remarks 29, and writes to the spend management remarks 29 to the transaction database 28 in association with the applicable invoice transaction data 14.

As discussed, the spend management parameters 19 may comprise mathematical evaluation parameters 19a (such as threshold evaluation parameter sets applied on a Boolean logic basis) and trending evaluation parameters 19b.

Figure 19:
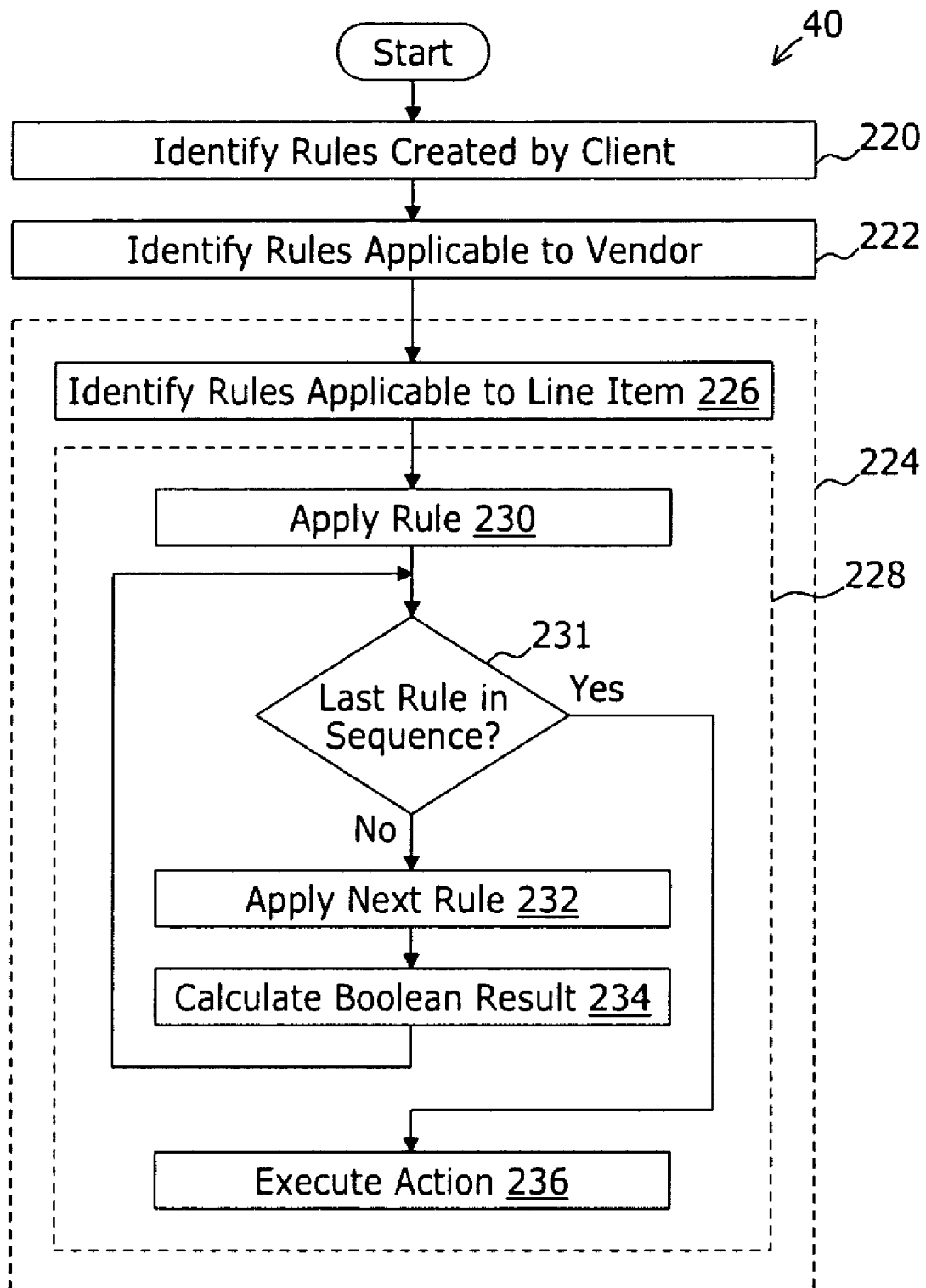
FIG. 19 is a flow chart representing exemplary operation of an evaluation engine in accordance with one embodiment of the present invention.

FIG. 19 represents exemplary operation of the evaluation engine 40 for applying mathematical function evaluation parameters 19a to invoice data 14. Referring to FIG. 19 in conjunction with FIG. 15, step 220 represents identifying those rules from the rules table 70 that were created by the client. This exemplary step is useful in an embodiment of the present invention wherein the spend management database 38 includes evaluation parameters 19 for multiple clients.

Step 222 represents identifying those rules (from the set of rules that has already been identified in step 220) that are applicable to the vendor of the invoice transaction. This step may be performed by identifying those rules that include a vendor code 241 (e.g identifying a vendor class) that includes the vendor associated with the invoice transaction.

The steps of group 224 are then performed for each line item of the invoice transaction. Step 226 represents identifying those rules (from those already identified at step 222) that are applicable to the line item. This step may be accomplished by identifying the application code 242 (defining a line item class) that includes the line item.

Turning briefly to FIG. 20, the application code 242 may be a two digit code that identifies the class of line items to which the rule applies. The exemplary codes 242 apply to such line items as follows: application code "01" indicates that the rule applies to all line items; application code "02" indicates that the rule applies to all line items for goods; application code "03" indicates that the rule applies to all line items for services; and application code "04" indicates that the rule applies to those line items with a description that matches "XYZ".

Returning to FIG. 19 in conjunction with FIG. 15, the steps of group 228 represent steps that are preformed for each rule identified at step 226 that is a first rule in a Boolean string. The first rule key 240 in the rules table 70 is a single digit code that identifies those rules that are first in a Boolean string of rules.

Step 228 represents applying such rule to the line item to generate a result selected from the group of results consisting of true and false (referred to here in a generating a true or false result). More specifically, a rule value is compared to an invoice line item value using a mathematical operand to determine the true or false result.

The mathematical operand is identified by a mathematical operand ID 243 in the rules table 70. Turning briefly to FIG. 21, the mathematical operand ID may be a two digit code that identifies one of a plurality of mathematical operands. The exemplary codes 243 may be as follows: operand ID code "01" is a greater than operand; operand ID code "02" is a greater than or equal to operand; operand ID code "03" is a less than operand; operand ID code "04" is a less than or equal to operand; and operand ID code "05" is an equal to operand.

Returning to FIG. 19 in conjunction with FIG. 15, the two values to be compared may be numerical values or character values. As such, a value type ID field 244 is included in the rules table 70. The value type ID field may be a two digit code that identifies the value type. For example, code "01" may represent a numeric value and code "02" may represent a character value.

If the value type ID 244 indicates that the values to be compared are numeric, the numeric value in the numeric value field 248 is compared using the mathematical operand to the applicable numeric value of the line item. Alternatively, if the value type ID 244 indicates that the values to be compared are characters, the character value in the character value field 246 is compared using the mathematical operand to the applicable character string of the line item.

The identity of the field in the invoice line item (e.g. identify of the field in the line item table 37 of FIG. 9*b*) to which the value is to be compared is identified by a line item ID code 251 in the rules table 70. The line item code 251 may be a two digit code identifying one of the fields in the line item table 37 such as the gross item amount field, discount item amount field, net item amount field, units field, unit price field, ect.

Following determination of the true or false result of application of the rule at step 230, the evaluation module 40 determines whether the rule is the last rule in a Boolean sequence of if there are additional rules at step 231. To enable evaluation module 40 to make such a determination, the rules table 70 includes a last rule key 252. The last rule key 252 may be a single digit code that indicates either that the rule is the last in a Boolean sequence or that there are additional rules in the Boolean sequence.

If the rule is the last rule at decision step 231, the spend management evaluation module 36 executes the appropriate action based on the true or false result of the rule application at step 236. More specifically, the rules table 70 includes a true action code field 249 and a false action code field 250. The true action code field 249 may comprise a two digit code that corresponds to an action that the evaluation engine 40 takes in the event of a true result.

The table of FIG. 22 represents some exemplary codes and actions. For example, code "01" may represent the evaluation engine writing a predefined message (that was established during rule configuration as discussed with reference to FIG. 14) to the spend management comment field 34 of the line item record in the line item table 37 of FIG. 9*b*. For example, if a rule compares the line item price with a value that represents a pre-negotiated contract price, the predefined message may be "price in excess of contract price". Code "02" may represent a different message such as "quantity in excess of standard". Code of "03" may represent the evaluation automatically generating a remittance transaction on behalf of the client 30 and writing the remittance transaction to database 28. Code "04" may represent the spend management evaluation module 40 automatically adjusting the value of one or more fields in the line item record of the line item table 37 and generating an email or transaction back to the vendor.

For example, the price field in the line item record may be adjusted to the contract price. Code "05" may represent writing a predefined message that includes a resultant value 292 to the auto analysis comment field 34 if the line item table 37 of FIG. 9*b* or the auto analysis comment field 47 of the invoice summary table 31 of FIG. 9*a*. (Writing the resultant value to the resultant value field 36 or field 49 will be discussed below). Code "05" may also include updating a value field 246 or 248 in the rules table 70 of FIG. 16. For example, the variable may be the percent deviation between the value field 248 and the units field of the line item table 37 of FIG. 9*b*. The message could be "Variable" deviation in units from previous invoice. It should be appreciated that because the value field is updated, the variable will always be variation from previous invoice.

Alternatively, if the evaluation is not the last evaluation at decision step 231, step 232 represent applying the next rule in the Boolean sequence. More specifically, the rules table 70 includes a Boolean rule number ID field 247 which includes a number that corresponds to the normalized rule number of the next rule in the Boolean sequence. Such threshold rule is applied at step 232 and the result of applying such rule is combined with the result of applying the previous rule(s) using the Boolean operand as identified in the Boolean operand ID field 260.

Turning briefly to FIG. 23, the Boolean operand ID 261 may be a two digit code that identifies one of a plurality of Boolean operands. The exemplary codes may be as follows: operand ID code "01" is the Boolean operand "AND"; operand ID code "02" is the Boolean operand "OR"; and operand ID code "03" is the Boolean operand "XOR".

Following the Boolean combination of the result of applying the next threshold rule at step 232, step 230 is then performed. After all rules in the Boolean sequence are performed and the results combined, step 236 will be reached wherein the action as designated by the true action code 254 or the false action code 256 in the record for the last rule in the Boolean sequence will be performed.

Figure 24:
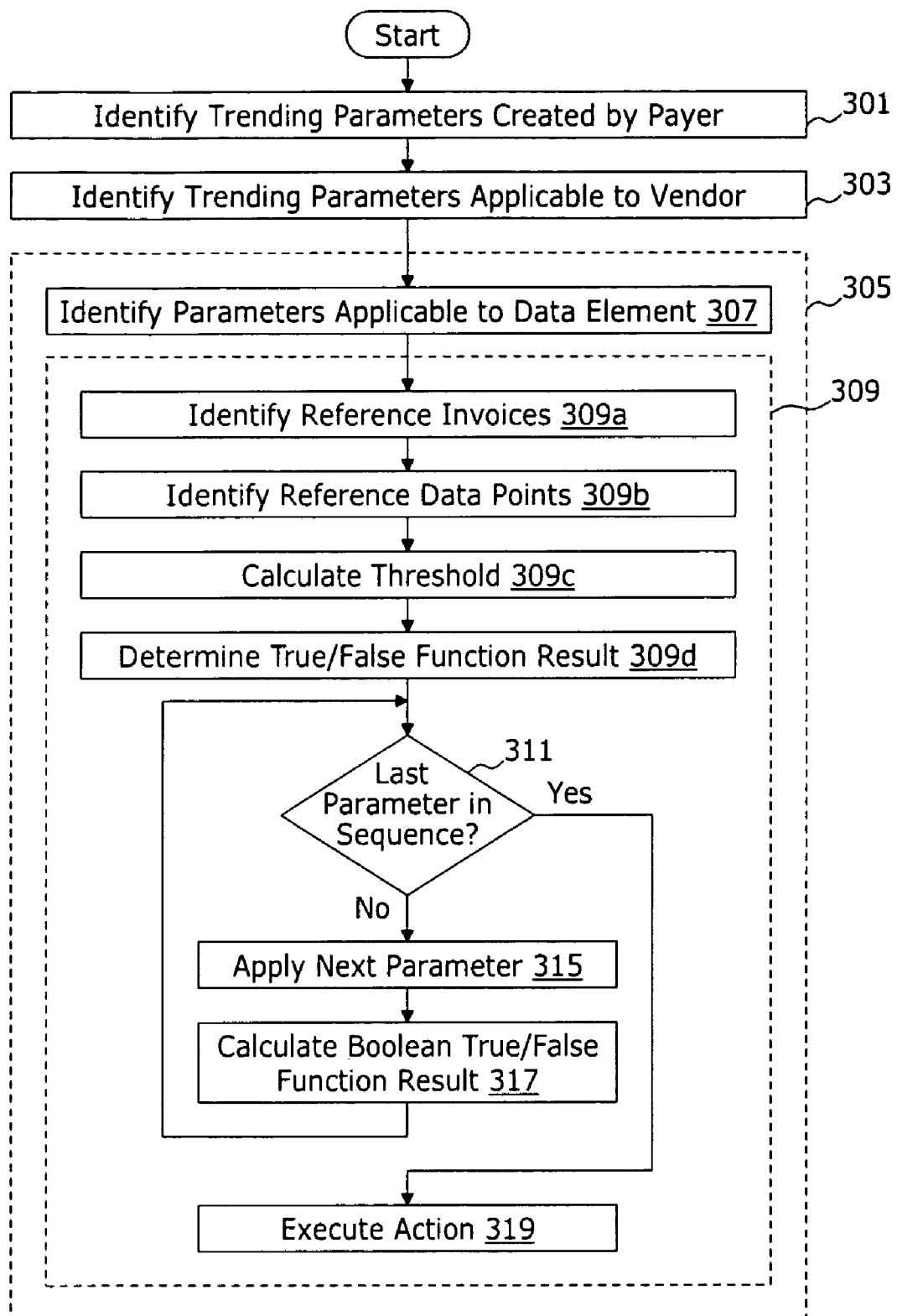
FIG. 24 is a flow chart representing exemplary operation of an evaluation engine in performing trending analysis in accordance with one embodiment of the present invention.

FIG. 24 represents exemplary operation of the evaluation module 40 in performing a trending analysis Referring to FIG. 24 in conjunction with FIG. 18, step 301 represents identifying those trending parameters from the trending analysis table 401 that were created by the client. Again, this step is useful in an embodiment of the present invention wherein the spend management database 38 includes spend management parameters 19 for multiple clients 30.

Step 303 represents identifying those trending parameters (from the set of parameters that has already been identified in step 301) that are applicable to the vendor of the invoice transaction. This step may be performed by identifying those parameters that include a vendor ID 43 (defining the vendor class) that includes the vendor of the invoice transaction.

The steps of group 305 are then performed for each data element of the invoice transaction (including invoice level data elements and line item level data elements). Step 307 represents identifying those parameters that are applicable to the data element. This step may be accomplished by identifying those parameters (from those already identified at step 303) that include a data point type key 405 and a line item data point type key 307 that correspond to the data element.

Turning briefly to FIG. 25, the invoice data point type key 316 may be a two digit code that identifies an invoice level data element to which the parameter applies. If the parameter applies to a line item level data element, the invoice data point type key 316 may be a particular key which so indicates. In the example, type key "01" indicates that the parameter applies to a line item level data element. The exemplary invoice data point type keys are as follows: type key "02" indicates that the parameter applies to the services gross amount data element; type key "03" indicates that the parameter applies to the services net amount data element; type key "04" indicates that the parameter applies to the goods gross amount data element; type key "05" indicates that the parameter applies to the goods net amount data element; type key "06" indicates that the parameter applies to the total gross amount data element; and type key "07" indicates that the parameter applies to the total net amount data element.

Turning briefly to FIG. 26, the line item data point type key 318 may be a two digit code that identifies a line item level data element to which the parameter applies. If the parameter applies to an invoice level data element, the line item data point type key 318 may be a particular key which so indicates. In the example, type key "01" indicates that the parameter applies to an invoice level data element. The exemplary line item data point type keys are as follows: type key "02" indicates that the parameter applies to the gross item amount data element; type key "03" indicates that the parameter applies to the net item amount data element; type key "04" indicates that the parameter applies to the units data element; type key "05" indicates that the parameter applies to the unit price data element; and type key "06" indicates that the parameter applies to the percent complete data element.

Returning to FIG. 24, the steps of group 309 represent steps that are preformed for each parameter identified at step 307 that is a first parameter in a Boolean string of one or more parameters. The first parameter key 324 in the table 312 is a single digit code that identifies those parameters first in a Boolean string of parameters.

Step 309a represents identifying reference invoices for use in applying the parameter. More specifically, the transaction identifier key 322 may be used to identify reference invoices. Referring briefly to FIG. 27, the transaction identifier key 322 may be a two digit code that identifies a group of invoices from which data points for may be extracted for performing the evaluation. In the example, identifier key "01" indicates that data points are within the one most recent invoice transactions; identifier key "02" indicates that the data points are within the two most recent invoice transactions; identifier key "03" indicates that the data points are within "x" most recent transactions; and identifier key "04" indicates that the data points are within the group of year-to-date invoices.

Returning to FIG. 24, step 309b represents identifying the reference data points. More specifically, the data points that correspond to the data point type and are within the reference invoices are extracted from the database. For example, if the data element value is a line item "units" value, the data point type would be a line item "units" value for goods or services of the same description or other identifier.

Step 309c represents calculating a threshold which includes determining an evaluation type threshold and then calculating the threshold using the reference data points extracted in step 309b. The evaluation type key 320 may be used to identify the evaluation type threshold. Referring briefly to FIG. 28, the evaluation type key 320 may be a two digit code that identifies a threshold for calculating a true false function result. For example, type key "01" indicates that the result of a true/false function is true if the data element is greater than the best fit line through the reference data points; type key "02" indicates that the result of a true/false function is true if the data element is greater than the average of the reference data points; type key "03" indicates that the result of a true/false function is true if the data element is greater than the mean of the reference data points. Returning to FIG. 24, step 309d represents determining the result of a true/false function.

Figure 29:
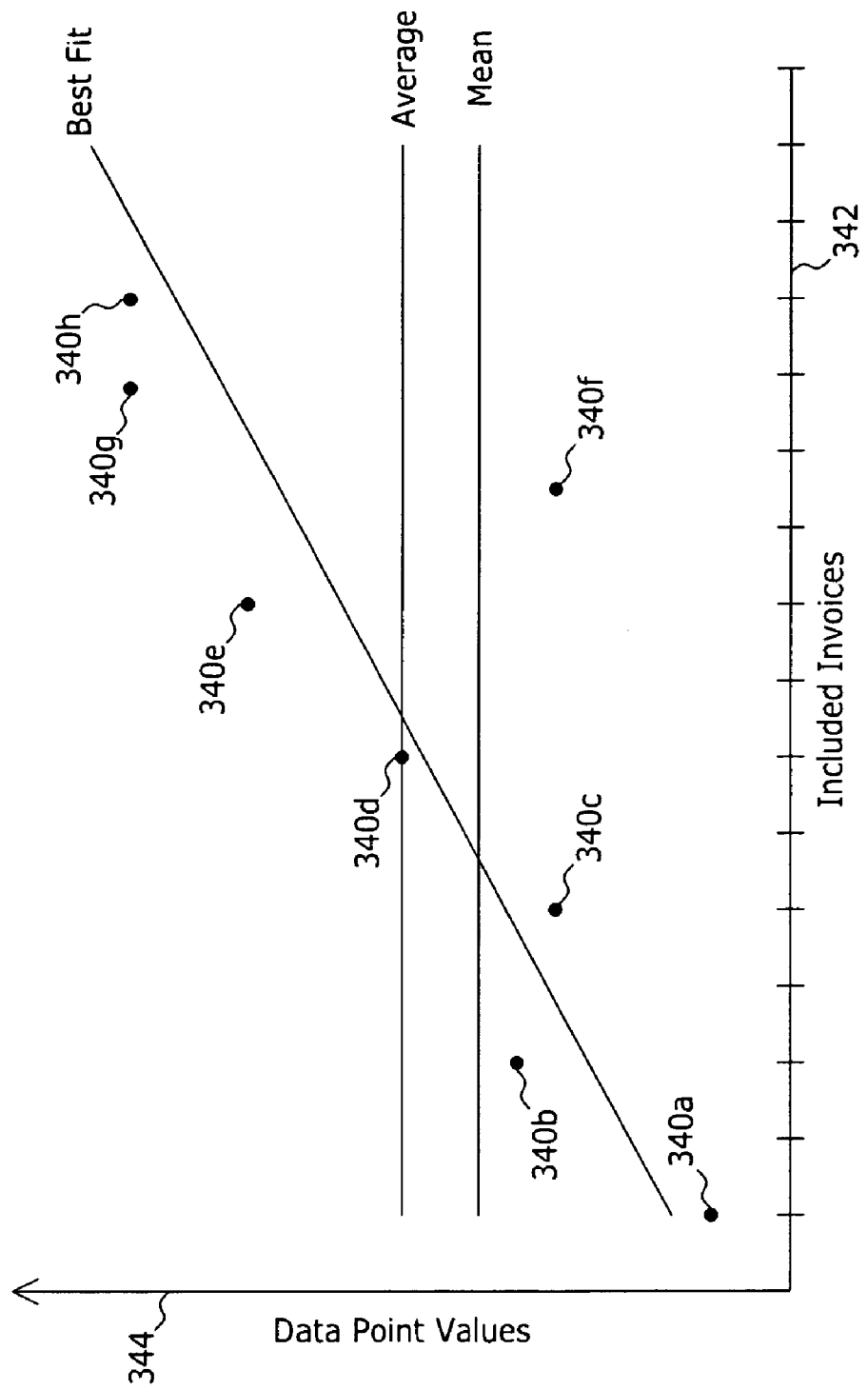
FIG. 29 is a graphic representation of trending analysis in accordance with one embodiment of the present invention.

Turning briefly to FIG. 29, a graphical representation of evaluation is shown. Reference data points 340a-340h are plotted on the vertical coordinate 344 with the horizontal coordinate 342 representing another parameter such as the date of each invoice from which the data point was extracted. A best fit line, an average, a mean, or other evaluation function may then be determined.

Returning to FIG. 24, step 311 represents determining whether the parameter is the last parameter in a Boolean sequence. The last parameter key 415 (FIG. 18) may be a single digit code that indicates either that the parameter is the last in a Boolean sequence or that there are additional parameters in the Boolean sequence.

If the parameter is the last parameter at decision step 311, the evaluation engine executes the appropriate action based on the true or false result of the rule application at step 309d. More specifically, the trending analysis table 401 includes a true action code field 421 and a false action code field 423. The true action code field 421 may comprise a two digit code that corresponds to an action that the evaluation engine 40 takes in the event of a true result and the false action code field 423 may comprise a two digit code that corresponds to an action that the valuation engine 40 takes in the event of a false result. Again, the table of FIG. 22, represents some exemplary codes and actions.

Alternatively, if the parameter is not the last parameter at decision step 311, step 315 represent applying the next parameter in the Boolean sequence. More specifically, the trending analysis table 401 includes a Boolean analysis number field 419 which includes a number that corresponds to the normalized trending analysis number of the next parameter in the Boolean sequence. Such parameter is applied at step 315 by using each of the steps previously discussed with reference to steps 309a through 309d and the result of applying such parameter is combined with the result of applying the previous parameter(s) using the Boolean operand as identified in the Boolean operand ID field 417 and with reference to the table of FIG. 18 at step 317.

Following the Boolean combination of the result of applying the next parameter at step 317, step 311 is again performed. After all parameters in the Boolean sequence are performed and the results combined, step 309 will be reached wherein the action as designated by the true action code 421 or the false action code 323 in the record for the last parameter in the Boolean sequence will be performed.

Data Management Details

When managing invoice data 14, exemplary management operations may include at least viewing invoice data 14 from the transaction database 28 and extracting a file of incremental invoice data 14 from the transaction database 28.

Figure 30:
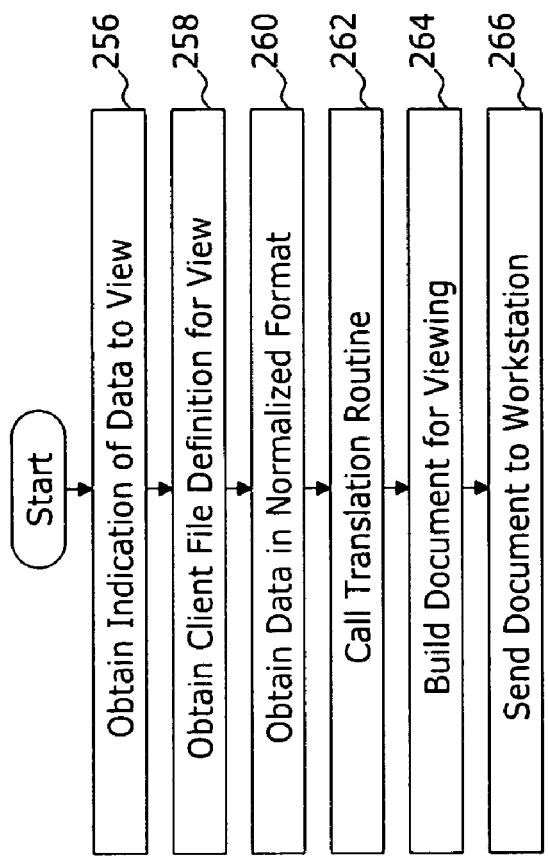
FIG. 30 is a flow chart representing an exemplary workflow script in accordance with one embodiment of the present invention.

The flowchart of FIG. 30 represents exemplary steps performed by the session management module 48 to facilitate viewing invoice data 14 from the transaction database 28. Step 256 represents obtaining an indication of the transactions that the user of the workstation 52 desires to view. This may include providing the workstation 52 with documents representing menus of choices for user selection and obtaining a post of the user selection through the secure session.

Step 258 represents obtaining the file definition for the transactions to be viewed either through operator selection of available definitions or by looking up a file definition that is associated with the client in an applicable database file.

Step 260 represents obtaining normalized transaction data from the database 28 that corresponds with the indication obtained at step 256. Step 262 represents calling a translation routine to convert the normalized transaction data to the file definition determined at step 260.

Step 264 represents building a document (including any transaction comments and resultant values that may have been written to transaction tables as discussed with respect to the evaluation engine 40) to display the transactions and step 266 represents sending the document to the workstation 52 through the secure session.

Figure 31:
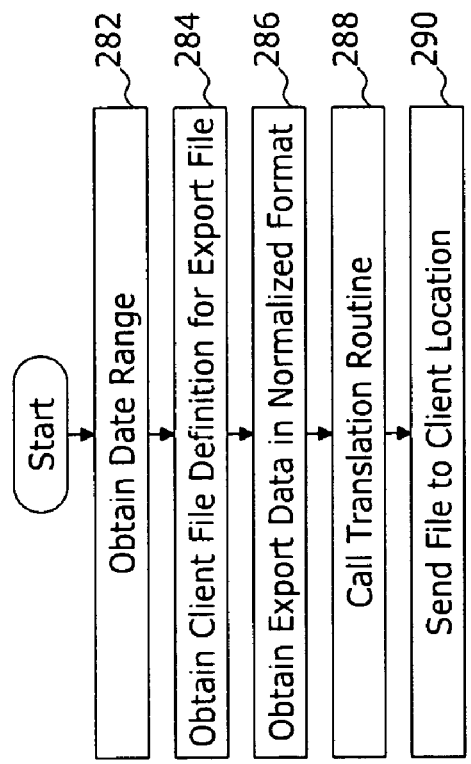
FIG. 31 is a flow chart representing an exemplary workflow script in accordance with one embodiment of the present invention.

Turning to the flowchart of FIG. 31, exemplary steps performed by the session management module 48 for extracting a file of incremental invoice data 14 from the database 28 for download to the client 30 are shown. Step 282 represents obtaining an indication of the incremental transactions to include in the extracted file.

In the exemplary embodiment wherein download is to a work station, the session management module 48 provides a document to the workstation 52 to prompt the user of the workstation 52 to enter a start date and an end date such that the incremental transactions are those that fall between such dates. In the exemplary embodiment wherein download is to an unattended interface station 56, the incremental data may be predefined in the database supporting the unattended interface station 56.

Step 284 represents obtaining the client file definition for the export file. The session management module 48 may obtain this by either looking up a file definition associated with the particular client 24 in an applicable database file or by providing a document to the workstation 52 to prompt the user of the workstation 52 to select from available client file definitions.

Step 286 represents obtaining the incremental transactions from the database 28 in the normalized format. Step 288 represents calling a translation routine to convert the normalized transaction to the file definition determined at step 284.

Step 290 represents building a file of the incremental transactions (including any transaction comments and resultant values that may have been written to transaction tables as discussed with respect to the evaluation engine 40 infra) and sending the file to the workstation 52 through the secure session.

Client Detail

Each client system 30 may include a local area network 50 that interconnects various systems that may include proprietary accounting database system 54, an unattended interface station 56, and at least one workstation 52. The accounting database system 54 may be any of a plurality of known accounting systems for recording and managing the client's financial records.

The workstation 52 may be a typical personal computer system that includes a web browser for establishing a TCP/IP connection (through the LAN 50, an appropriate gateway (not shown) and the Internet (not shown)) and interfacing with web server systems such as the session management module 48 of the ITS 10.

The unattended interface station 56 has the function of automatically transferring files between the accounting database system 54 and a remote system such as the session management module 48 of the ITS 10 through a TCP/IP connection. More specifically, the unattended interface station 56: i) transfers files which are written to a network accessible upload directory 53 of the client system 30 to the session management module 48; and ii) writes files received from the session management module 48 to a network accessible download directory 55.

SUMMARY

In summary, the present invention provides for automated analysis of transaction data elements based on rules, automated trending analysis based on evaluation parameters, and automated quantitative analysis based on evaluation functions. All such rules, evaluation parameters, and evaluation functions may be established by the customer/payer to apply to all transactions, or to transactions only from certain vendors.

Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. An invoice processing system for receiving, validating, and evaluating a client's invoices, the invoice processing system comprising:
   a document work flow system receiving invoice data embodied in a document image and comprising:
      a character recognition system receiving an electronic representation of the document image and generating a data field value for each of a plurality of data fields, the character recognition system determining each data field value by:
         determining field marker characters associated with a data field;
         recognizing the field marker characters within the electronic representation of the document image;
         identifying a field value location within the electronic representation of the document image, the field value location being within a predetermined displacement from the field marker characters;
         recognizing characters located within the field value location to determine the data field value;
         writing the data field value with the data field;
      a data field value validation engine:
         determining, for each data field, a data field value rule associated with each data field; and
         applying the data field value rule to the data field value associated with the data field to distinguish between a valid data field value and a suspect data field value, the valid data file value consist of a data field value which complies with a validation rule, the suspect data field value consist of a data field value which fails to comply with the validation rule; and
      a correction center, the correction center:
         displaying at least a portion of the document image which includes the field value location;
         receiving user input of a replacement data field value to replace the suspect field value as the valid data field value;

an invoice hub receiving each valid data field value as a data file comprising records of invoice data, the invoice hub comprising:
  a spend management database comprising a plurality of evaluation parameter sets, each evaluation parameter set comprising at least:
    identification of a vendor class to which the evaluation parameter set applies;
    identification of an invoice line item class to which the evaluation parameter set applies;
    an evaluation function;
    at least one indicator of a defined action associated with a defined function result;
  a spend management evaluation module:
    selecting at least one record of invoice data which represents an amount invoiced by a vendor that is both: i) associated with the vendor within the vendor class of a selected one of the evaluation parameter sets; and ii) associated with a line item that is within the invoice line item class of the selected one of the evaluation parameter sets;
    performing the evaluation function of the selected one of the evaluation parameter sets on the at least one record of invoice data to generate a resulting value;
    determining an evaluation field value in accordance with the defined action;
    associating the evaluation field value with the at least one record of invoice data; and
  a session management module for establishing a secure session with a client system and providing an invoice file through the secure session, the invoice file comprising both the at least one record of invoice data and the evaluation field value.

2. The invoice processing system of claim 1, wherein: the session management module further:
  establishes a second secure session with the client system;
  obtains the at least one evaluation parameter set from the client system through the second secure session; and
  writes the at least one evaluation parameter set to the spend management database.

3. The invoice processing system of claim 2, wherein: the evaluation function of the at least one evaluation parameter set is a threshold evaluation function and the at least one evaluation parameter set further comprises:
  a threshold value;
  a mathematical operand; and
  the at least one indicator of the defined action associated with the defined function result comprises:
    a true action indicator of a true action associated with a defined function result of true;
    a false action indicator of a false action associated with a defined function result of false;
    the true action defining a first auto analysis comment to be associated with the evaluation field value in an event that the spend management evaluation module determines that comparison of the field of the record of invoice data to the threshold value using the mathematical operand generates a function result of true; and
    the false action defining a second auto analysis comment to be associated with the evaluation field in an event that the spend management evaluation module determines that comparison of the field of the record of invoice data to the threshold value using the mathematical operand generates a function result of false.

4. The electronic transaction processing server of claim 3, wherein:
  the evaluation field value is a predetermined price; and
  at least one of the true action and the false action comprises writing an indication that the value of the line item is in excess of the predetermined price.

5. The electronic transaction processing server of claim 3, wherein:
  the evaluation field value is a predetermined quantity; and
  at least one of the true action and the false action comprises writing an indication that the value of the line item is in excess of the predetermined quantity.

6. The invoice processing system of claim 3, wherein:
  the invoice file is a paper invoice document; and
  the document work flow system further comprises an imaging system for converting a contents of the paper invoice document to the electronic representation of the document image.

7. The invoice processing system of claim 2, wherein:
  the spend management database links a first evaluation parameter set to a second evaluation parameter set by a Boolean logic function;
    the first evaluation parameter set being a first one of the plurality of evaluation parameter sets;
    the second evaluation parameter set being a second one of the plurality of evaluation parameter sets;
  a at least one defined action of the first evaluation parameter set comprises:
    a true action, the true action defining input of a first sub resulting value of true to the Boolean logic function; and
    a false action, the false action defining input of a first sub resulting value of false to the Boolean logic function;
  a at least one defined action of the second evaluation parameter set comprising:
    a true action, the true action defining input of a second sub resulting value of true to the Boolean logic function; and
    a false action, the false action defining input of a second sub resulting value of false to the Boolean logic function; and
  wherein the spend management evaluation module performing the evaluation function of a selected one of the evaluation parameter sets on the at least one record of invoice data to generate a resulting value comprises:
    performing the evaluation function of the first evaluation parameter set on the at least one record of invoice data to generate the first sub-resulting value;
    performing the evaluation function of the second evaluation parameter set on the at least one record of invoice data to generate the second sub-resulting value; and
    using the first sub-resulting value and the second sub-resulting value as input to the Boolean logic function to generate the resulting value.

8. The invoice processing system of claim 7, wherein the first evaluation parameter set and the second evaluation parameter set include the same values for identification of the vendor class and identification of the invoice line item class.

9. The electronic transaction processing server of claim 8, wherein:
  the evaluation field value is a predetermined price; and
  at least one of the true action and the false action comprises writing an indication that the value of the line item is in excess of the predetermined price.

10. The electronic transaction processing server of claim 8, wherein:
the evaluation field value is a predetermined quantity; and
at least one of the true action and the false action comprises writing an indication that the value of the line item is in excess of the predetermined quantity.

11. The invoice processing system of claim 8, wherein:
the invoice file is a paper invoice document; and
the document work flow system further comprises an imaging system for converting a contents of the paper invoice document to the electronic representation of the document image.

12. A method of operating an invoice processing system for receiving, validating, and evaluating a client's invoices, the method comprising:
receiving invoice data embodied in a document image at a document work flow system:
performing a character recognition process on an electronic representation of the document image to generate a data field value for each of a plurality of data fields, the character recognition process determining each data field value by:
determining field marker characters associated with a data field;
recognizing the field marker characters within the electronic representation of the document image;
identifying a field value location within the electronic representation of the document image, the field value location being within a predetermined displacement from the field marker characters; and
recognizing characters located within the field value location to determine the data field value;
validating the data field value for each of the plurality of data fields by:
determining a data field value rule associated with the data field; and
applying the data field value rule to the data field value to distinguish between a valid data field value and a suspect data field value, the valid data field value consist of a data field value which complies with a validation rule the suspect data field value consist of a data field value which fails to comply with the validation rule;
performing a correction process on each suspect data field value, the correction process comprising:
displaying at least a portion of the document image which includes the field value location;
receiving user input of a replacement data field value to replace the suspect field value as the valid data field value;
loading the validated data field values, as a data file comprising records of invoice data to a transaction database;
loading a spend management evaluation parameter set to a spend management database, the spend management evaluation parameter set comprising at least:
identification of a vendor class to which the evaluation parameter set applies;
identification of an invoice line item class to which the evaluation parameter set applies;
an evaluation function;
at least one indicator of a defined action associated with a defined function result;
performing a spend management evaluation by:
selecting at least one record of invoice data which represents an amount invoiced by a vendor that is both: i) associated with the vendor within the vendor class of a selected one of the evaluation parameter sets; and ii) associated with a line item that is within the invoice line item class of the selected one of the evaluation parameter sets;
performing the evaluation function of the selected one of the evaluation parameter sets on the at least one record of invoice data to generate a resulting value;
determining an evaluation field value in accordance with the defined action;
associating the evaluation field value with the at least one record of invoice data; and
providing, to a client system, an invoice file comprising both the at least one record of invoice data and the evaluation field value.

13. The method of claim 12, wherein:
the evaluation function of at least one evaluation parameter set is a threshold evaluation function and the at least one evaluation parameter set further comprises:
a threshold value
a mathematical operand; and
the at least one indicator of the defined action associated with the defined function result comprises:
a true action indicator of a true action associated with a defined function result of true;
a false action indicator of a false action associated with a defined function result of false;
the true action defining a first auto analysis comment to be associated with the evaluation field value in an event that the spend management evaluation module determines that comparison of the field of the record of invoice data to the threshold value using the mathematical operand generates a function result of true; and
the false action defining a second auto analysis comment to be associated with the evaluation field in an event that the spend management evaluation module determines that comparison of the field of the record of invoice data to the threshold value using the mathematical operand generates a function result of false.

14. The method of claim 13, wherein:
the evaluation field value is a predetermined price; and
at least one of the true action and the false action comprises writing an indication that the value of the line item is in excess of the predetermined price.

15. The method of claim 13, wherein:
the evaluation field value is a predetermined quantity; and
at least one of the true action and the false action comprises writing an indication that the value of the line item is in excess of the predetermined quantity.

16. The method of claim 13, wherein:
the invoice file is a paper invoice document; and
the method further comprises driving an imaging system for converting the contents of the paper invoice document to the electronic representation of the document image.

17. The method of claim 12, wherein
the spend management database links a first evaluation parameter set to a second evaluation parameter set by a Boolean logic function;
the first evaluation parameter set being a first one of the plurality of evaluation parameter sets;
the second evaluation parameter set being a second one of the plurality of evaluation parameter sets;

the at least one defined action of the first evaluation parameter set comprises:
  a true action, the true action defining input, of a first sub resulting value of true to the Boolean logic function; and
  a false action, the false action defining input of a first sub resulting value of false to the Boolean logic function;
the at least one defined action of the second evaluation parameter set comprising:
  a true action, the true action defining input of a second sub resulting value of true to the Boolean logic function; and
  a false action, the false action defining input of a second sub resulting value of false to the Boolean logic function;
wherein performing the evaluation function of the selected one of the evaluation parameter sets on the at least one record of invoice data to generate a resulting value comprises:
  performing the evaluation function of the first evaluation parameter set on the at least one record of invoice data to generate the first sub-resulting value;
  performing the evaluation function of the second evaluation parameter set on the at least one record of invoice data to generate the second sub-resulting value;
  using the first sub-resulting value and the second sub-resulting value as input to the Boolean logic function to generate the resulting value.

18. The method of claim 17, wherein the first evaluation parameter set and the second evaluation parameter set includes the same values for identification of the vendor class and identification of the invoice line item class.

19. The method of claim 18, wherein:
the evaluation field value is a predetermined price; and
at least one of the true action and the false action comprises writing an indication that the value of the line item is in excess of the predetermined price.

20. The method of claim 18, wherein:
the evaluation field value is a predetermined quantity; and
at least one of the true action and the false action comprises writing an indication that the value of the line item is in excess of the predetermined quantity.

21. The method of claim 18, wherein:
the invoice file a paper invoice document; and
the method further comprises driving an imaging system for converting a contents of the paper invoice document to the electronic representation of the document image.

* * * * *